US011400650B2

(12) United States Patent
Adzima

(10) Patent No.: US 11,400,650 B2
(45) Date of Patent: *Aug. 2, 2022

(54) METHODS AND SYSTEMS FOR STEREOLITHOGRAPHY THREE-DIMENSIONAL PRINTING

(71) Applicant: Holo, Inc., Newark, CA (US)

(72) Inventor: Brian Adzima, Hayward, CA (US)

(73) Assignee: Holo, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,082

(22) Filed: Apr. 7, 2020

(65) Prior Publication Data

US 2020/0316865 A1 Oct. 8, 2020

Related U.S. Application Data

(63) Continuation of application No. 16/276,148, filed on Feb. 14, 2019, now abandoned, which is a continuation of application No. 16/049,288, filed on Jul. 30, 2018, now Pat. No. 10,245,785, which is a continuation of application No. PCT/US2018/037630, filed on Jun. 14, 2018.

(60) Provisional application No. 62/521,117, filed on Jun. 16, 2017.

(51) Int. Cl.
| | |
|---|---|
| *B29C 64/282* | (2017.01) |
| *B29C 64/135* | (2017.01) |
| *B33Y 70/00* | (2020.01) |
| *B33Y 30/00* | (2015.01) |
| *B33Y 10/00* | (2015.01) |
| *B29C 31/04* | (2006.01) |
| *B29C 64/124* | (2017.01) |
| *B29C 35/08* | (2006.01) |
| *B29C 64/129* | (2017.01) |

(52) U.S. Cl.
CPC .......... *B29C 64/282* (2017.08); *B29C 31/042* (2013.01); *B29C 31/044* (2013.01); *B29C 31/045* (2013.01); *B29C 31/047* (2013.01); *B29C 35/0888* (2013.01); *B29C 64/124* (2017.08); *B29C 64/129* (2017.08); *B29C 64/135* (2017.08); *B33Y 10/00* (2014.12); *B33Y 30/00* (2014.12); *B33Y 70/00* (2014.12)

(58) Field of Classification Search
CPC ... B29C 64/282; B29C 31/045; B29C 64/124; B29C 31/047; B29C 35/0888; B29C 31/044; B29C 64/129; B29C 31/042; B29C 64/135; B33Y 70/00; B33Y 30/00; B33Y 10/00

See application file for complete search history.

(56) References Cited

U.S. PATENT DOCUMENTS

| | | |
|---|---|---|
| 4,252,887 A | 2/1981 | Dessauer |
| 4,269,933 A | 5/1981 | Pazos |
| 4,801,477 A | 1/1989 | Fudim |
| 4,814,370 A | 3/1989 | Kramer et al. |
| 4,961,154 A | 10/1990 | Pomerantz et al. |
| 5,006,364 A | 4/1991 | Fan |
| 5,096,530 A | 3/1992 | Cohen |
| 5,137,662 A | 8/1992 | Hull et al. |
| 5,143,668 A | 9/1992 | Hida et al. |
| 5,182,056 A | 1/1993 | Spence et al. |
| 5,184,307 A | 2/1993 | Hull et al. |
| 5,236,326 A | 8/1993 | Grossa |
| 5,248,456 A | 9/1993 | Evans, Jr. et al. |
| 5,330,701 A | 7/1994 | Shaw et al. |
| 5,474,719 A | 12/1995 | Fan et al. |
| 5,531,958 A | 7/1996 | Krueger |
| 5,545,367 A | 8/1996 | Bae et al. |
| 5,656,297 A | 8/1997 | Bernstein et al. |
| 5,676,745 A | 10/1997 | Kelly et al. |
| 5,877,270 A | 3/1999 | Takayama et al. |
| 5,922,507 A | 7/1999 | Van et al. |
| 5,998,496 A | 12/1999 | Hassoon et al. |

(Continued)

FOREIGN PATENT DOCUMENTS

| | | |
|---|---|---|
| CN | 1418974 A | 5/2003 |
| CN | 1916034 A | 2/2007 |

(Continued)

OTHER PUBLICATIONS

"Final Office action dated Jan. 7, 2019 for U.S. Appl. No. 14/967,055".
GB1809886.3 Office Action dated May 16, 2019.
PCT/US2019/068413 Search Report & Written Opinion dated Apr. 23, 2020.
U.S. Appl. No. 15/983,962 Notice of Allowance dated Dec. 20, 2018.
U.S. Appl. No. 14/967,055 Office Action dated Jan. 7, 2019.
U.S. Appl. No. 15/374,734 Office Action dated Feb. 26, 2020.
U.S. Appl. No. 15/919,124 Office Action dated Jun. 25, 2020.
U.S. Appl. No. 16/016,253 Office Action dated Feb. 21, 2019.
U.S. Appl. No. 16/016,253 Office Action dated Oct. 21, 2019.

(Continued)

*Primary Examiner* — Jessica M Roswell
(74) *Attorney, Agent, or Firm* — Wilson Sonsini Goodrich & Rosati

(57) ABSTRACT

The present disclosure provides method and systems for printing a three-dimensional (3D) object. A method for 3D printing may comprise providing a mixture comprising (i) a polymeric precursor, (ii) a photoinitiator configured to initiate formation of a polymeric material from the polymeric precursor, and (iii) a photoinhibitor configured to inhibit the formation of the polymeric precursor. The method may comprise exposing the mixture to (i) a first light to cause the photoinitiator to initiate formation of the polymeric material, thereby to print the 3D object, and (ii) a second light to cause the photoinhibitor to inhibit the formation of the polymeric material. During printing of the 3D object, a ratio of (i) an energy of the second light sufficient to initiate formation of the polymeric material relative to (ii) an energy of the first light sufficient to initiate formation of the polymeric material may be greater than 1.

25 Claims, 5 Drawing Sheets

(56) References Cited

U.S. PATENT DOCUMENTS

| | | |
|---|---|---|
| 6,090,865 A | 7/2000 | Dudman et al. |
| 6,093,761 A | 7/2000 | Schofalvi et al. |
| 6,100,007 A | 8/2000 | Pang et al. |
| 6,204,316 B1 | 3/2001 | Schofalvi et al. |
| 6,259,962 B1 | 7/2001 | Gothait |
| 6,376,585 B1 | 4/2002 | Schofalvi et al. |
| 6,399,010 B1 | 6/2002 | Guertin et al. |
| 6,658,314 B1 | 12/2003 | Gothait |
| 6,664,354 B2 | 12/2003 | Savu et al. |
| 6,780,472 B2 | 8/2004 | Hamrock et al. |
| 6,833,043 B1 | 12/2004 | Parsonage et al. |
| 6,846,862 B2 | 1/2005 | Schofalvi et al. |
| 6,850,334 B1 | 2/2005 | Gothait |
| 6,852,781 B2 | 2/2005 | Savu et al. |
| 7,022,410 B2 | 4/2006 | Tonapi et al. |
| 7,079,915 B2 | 7/2006 | Huang et al. |
| 7,101,618 B2 | 9/2006 | Coggio et al. |
| 7,173,778 B2 | 2/2007 | Jing et al. |
| 7,195,472 B2 | 3/2007 | John |
| 7,209,797 B2 | 4/2007 | Kritchman et al. |
| 7,223,826 B2 | 5/2007 | Ali et al. |
| 7,267,850 B2 | 9/2007 | Coggio et al. |
| 7,288,469 B2 | 10/2007 | Sharma et al. |
| 7,288,514 B2 | 10/2007 | Scheuing et al. |
| 7,332,217 B2 | 2/2008 | Coggio et al. |
| 7,417,099 B2 | 8/2008 | Savu et al. |
| 7,433,627 B2 | 10/2008 | German et al. |
| 7,438,846 B2 | 10/2008 | John |
| 7,491,441 B2 | 2/2009 | Pokorny et al. |
| 7,511,008 B2 | 3/2009 | Scheuing et al. |
| 7,575,847 B2 | 8/2009 | Jing et al. |
| 7,632,560 B2 | 12/2009 | Filippini et al. |
| 7,662,896 B2 | 2/2010 | Savu et al. |
| 7,718,264 B2 | 5/2010 | Klun et al. |
| 7,845,930 B2 | 12/2010 | Shkolnik et al. |
| 7,907,878 B2 | 3/2011 | Takagi et al. |
| 7,912,411 B2 | 3/2011 | Takagi et al. |
| 7,961,154 B2 | 6/2011 | Qi et al. |
| 8,110,135 B2 | 2/2012 | El-Siblani |
| 8,133,551 B2 | 3/2012 | Claes |
| 8,147,966 B2 | 4/2012 | Klun et al. |
| 8,372,330 B2 | 2/2013 | El-Siblani et al. |
| 8,372,913 B2 | 2/2013 | Claes |
| 8,394,313 B2 | 3/2013 | Shkolnik et al. |
| 8,476,398 B2 | 7/2013 | Klun et al. |
| 8,551,285 B2 | 10/2013 | Ho et al. |
| 8,623,264 B2 | 1/2014 | Rohner et al. |
| 8,696,971 B2 | 4/2014 | Boot et al. |
| 8,716,377 B2 | 5/2014 | Taden et al. |
| 8,729,211 B2 | 5/2014 | Klun et al. |
| 8,734,715 B2 | 5/2014 | Miller et al. |
| 8,741,203 B2 | 6/2014 | Liska et al. |
| 8,753,464 B2 | 6/2014 | Khanna |
| 8,753,714 B2 | 6/2014 | Cheung et al. |
| 8,801,418 B2 | 8/2014 | El-Siblani et al. |
| 8,829,070 B2 | 9/2014 | Morita et al. |
| 8,859,642 B2 | 10/2014 | Miyamoto |
| 8,916,335 B2 | 12/2014 | Kitano et al. |
| 9,108,358 B1 | 8/2015 | Herloski et al. |
| 9,120,270 B2 | 9/2015 | Chen et al. |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,306,218 B2 | 4/2016 | Pyun et al. |
| 9,360,757 B2 | 6/2016 | Desimone et al. |
| 9,367,049 B2 | 6/2016 | Jariwala et al. |
| 9,415,418 B2 | 8/2016 | Sreenivasan et al. |
| 9,452,567 B2 | 9/2016 | Syao et al. |
| 9,453,142 B2 | 9/2016 | Rolland et al. |
| 9,486,944 B2 | 11/2016 | El-Siblani et al. |
| 9,492,969 B2 | 11/2016 | Spadaccini et al. |
| 9,498,920 B2 | 11/2016 | Desimone et al. |
| 9,527,244 B2 | 12/2016 | El-Siblani et al. |
| 9,533,450 B2 | 1/2017 | El-Siblani et al. |
| 9,561,623 B2 | 2/2017 | El-Siblani et al. |
| 9,567,439 B1 | 2/2017 | Pyun et al. |
| 9,598,606 B2 | 3/2017 | Rolland et al. |
| 9,676,963 B2 | 6/2017 | Rolland et al. |
| 9,718,096 B2 | 8/2017 | Sreenivasan et al. |
| 9,782,934 B2 | 10/2017 | Willis et al. |
| 9,796,138 B2 | 10/2017 | Liska et al. |
| 9,833,839 B2 | 12/2017 | Gibson et al. |
| 9,975,295 B2 | 5/2018 | Rolland et al. |
| 9,975,296 B2 | 5/2018 | El-Siblani et al. |
| 9,982,164 B2 | 5/2018 | Rolland et al. |
| 9,987,653 B2 | 6/2018 | Sreenivasan et al. |
| 9,987,804 B2 | 6/2018 | El-Siblani et al. |
| 9,993,974 B2 | 6/2018 | Desimone et al. |
| 10,011,076 B2 | 7/2018 | El-Siblani et al. |
| 10,016,938 B2 | 7/2018 | Desimone et al. |
| 10,072,921 B2 | 9/2018 | Fu et al. |
| 10,073,424 B2 | 9/2018 | Lin et al. |
| 10,150,280 B2 | 12/2018 | Aghababaie et al. |
| 10,166,725 B2 | 1/2019 | Willis et al. |
| 10,213,956 B2 | 2/2019 | Willis et al. |
| 10,245,785 B2 | 4/2019 | Adzima |
| 10,354,445 B2 | 7/2019 | Greene et al. |
| 10,421,233 B2 | 9/2019 | Lin et al. |
| 10,464,259 B2 | 11/2019 | Lin |
| 2001/0035597 A1 | 11/2001 | Grigg et al. |
| 2003/0043360 A1 | 3/2003 | Farnworth |
| 2003/0114936 A1 | 6/2003 | Sherwood et al. |
| 2004/0138049 A1 | 7/2004 | Yasrebi et al. |
| 2004/0187714 A1 | 9/2004 | Napadensky et al. |
| 2006/0054039 A1 | 3/2006 | Kritchman et al. |
| 2006/0163774 A1 | 7/2006 | Abels et al. |
| 2006/0257785 A1 | 11/2006 | Johnson |
| 2007/0264481 A1 | 11/2007 | Desimone et al. |
| 2008/0169586 A1 | 7/2008 | Hull et al. |
| 2008/0181977 A1 | 7/2008 | Sperry et al. |
| 2008/0252682 A1 | 10/2008 | Hernandez et al. |
| 2009/0196946 A1 | 8/2009 | Kihara et al. |
| 2009/0304952 A1 | 12/2009 | Kritchman |
| 2010/0028994 A1 | 2/2010 | Desimone et al. |
| 2010/0029801 A1 | 2/2010 | Moszner et al. |
| 2010/0125356 A1 | 5/2010 | Shkolnik et al. |
| 2010/0173096 A1 | 7/2010 | Kritchman et al. |
| 2011/0089610 A1 | 4/2011 | El-Siblani et al. |
| 2011/0181941 A1 | 7/2011 | Henningsen |
| 2011/0182805 A1 | 7/2011 | Desimone et al. |
| 2011/0287185 A1 | 11/2011 | Felstead et al. |
| 2011/0310370 A1 | 12/2011 | Rohner et al. |
| 2011/0318595 A1 | 12/2011 | Breiner et al. |
| 2012/0046376 A1 | 2/2012 | Loccufier et al. |
| 2012/0107625 A1 | 5/2012 | Smith et al. |
| 2012/0195994 A1 | 8/2012 | El-Siblani et al. |
| 2013/0000553 A1 | 1/2013 | Hoechsmann et al. |
| 2013/0001834 A1 | 1/2013 | El-Siblani et al. |
| 2013/0056910 A1 | 3/2013 | Houbertz-Krauss et al. |
| 2013/0123988 A1 | 5/2013 | Jariwala et al. |
| 2013/0252178 A1 | 9/2013 | Mcleod et al. |
| 2013/0336884 A1 | 12/2013 | Desimone et al. |
| 2014/0084517 A1 | 3/2014 | Sperry et al. |
| 2014/0265032 A1 | 9/2014 | Teicher et al. |
| 2014/0339741 A1 | 11/2014 | Aghababaie et al. |
| 2014/0361463 A1 | 12/2014 | Desimone et al. |
| 2015/0019000 A1 | 1/2015 | Nakamura |
| 2015/0064298 A1 | 3/2015 | Syao |
| 2015/0072293 A1 | 3/2015 | Desimone et al. |
| 2015/0077215 A1 | 3/2015 | Ranky et al. |
| 2015/0097315 A1 | 4/2015 | Desimone et al. |
| 2015/0097316 A1 | 4/2015 | Desimone et al. |
| 2015/0102532 A1 | 4/2015 | Desimone et al. |
| 2015/0183168 A1 | 7/2015 | Liverman et al. |
| 2015/0202805 A1 | 7/2015 | Saruhashi et al. |
| 2015/0224710 A1 | 8/2015 | El-Siblani et al. |
| 2015/0231828 A1 | 8/2015 | El-Siblani et al. |
| 2015/0231831 A1 | 8/2015 | El-Siblani |
| 2015/0273632 A1 | 10/2015 | Chen |
| 2015/0287169 A1 | 10/2015 | Ueda et al. |
| 2015/0290881 A1 | 10/2015 | Ederer et al. |
| 2015/0328839 A1 | 11/2015 | Willis et al. |
| 2015/0331402 A1 | 11/2015 | Lin et al. |
| 2015/0343745 A1 | 12/2015 | Pesek et al. |

(56) References Cited

U.S. PATENT DOCUMENTS

| | | |
|---|---|---|
| 2015/0344682 A1 | 12/2015 | Ganapathiappan et al. |
| 2015/0360419 A1 | 12/2015 | Willis et al. |
| 2016/0023403 A1 | 1/2016 | Ramos et al. |
| 2016/0023467 A1 | 1/2016 | Din et al. |
| 2016/0046075 A1 | 2/2016 | Desimone et al. |
| 2016/0059484 A1 | 3/2016 | Desimone et al. |
| 2016/0059486 A1 | 3/2016 | Desimone et al. |
| 2016/0059487 A1 | 3/2016 | Desimone et al. |
| 2016/0067921 A1 | 3/2016 | Willis et al. |
| 2016/0121547 A1 | 5/2016 | Kobayashi |
| 2016/0122539 A1 | 5/2016 | Okamoto et al. |
| 2016/0131974 A1 | 5/2016 | Abe et al. |
| 2016/0136889 A1 | 5/2016 | Rolland et al. |
| 2016/0141535 A1 | 5/2016 | Snaith et al. |
| 2016/0158889 A1 | 6/2016 | Carter et al. |
| 2016/0160077 A1 | 6/2016 | Rolland et al. |
| 2016/0164031 A1 | 6/2016 | Pieper et al. |
| 2016/0167301 A1 | 6/2016 | Cole et al. |
| 2016/0170218 A1 | 6/2016 | Johnson et al. |
| 2016/0193786 A1 | 7/2016 | Moore et al. |
| 2016/0200052 A1 | 7/2016 | Moore et al. |
| 2016/0214321 A1 | 7/2016 | Tow et al. |
| 2016/0271870 A1 | 9/2016 | Brown, Jr. |
| 2016/0271875 A1 | 9/2016 | Brown, Jr. |
| 2016/0303793 A1 | 10/2016 | Ermoshkin et al. |
| 2016/0303795 A1 | 10/2016 | Liu et al. |
| 2016/0325493 A1 | 11/2016 | Desimone et al. |
| 2016/0332386 A1 | 11/2016 | Kuijpers |
| 2016/0368054 A1 | 12/2016 | Ng et al. |
| 2016/0368210 A1 | 12/2016 | Chen et al. |
| 2016/0368221 A1 | 12/2016 | Ueda et al. |
| 2017/0015058 A1 | 1/2017 | Ueda et al. |
| 2017/0021562 A1 | 1/2017 | El-Siblani et al. |
| 2017/0022312 A1 | 1/2017 | Liu et al. |
| 2017/0080641 A1 | 3/2017 | El-Siblani |
| 2017/0087765 A1 | 3/2017 | Rundlett et al. |
| 2017/0087769 A1 | 3/2017 | Lancaster-Larocque et al. |
| 2017/0106399 A1 | 4/2017 | Sreenivasan et al. |
| 2017/0106603 A1 | 4/2017 | Pobihun |
| 2017/0113406 A1 | 4/2017 | Chen et al. |
| 2017/0113416 A1 | 4/2017 | Desimone et al. |
| 2017/0120326 A1 | 5/2017 | Heikkila et al. |
| 2017/0120515 A1 | 5/2017 | Rolland et al. |
| 2017/0151718 A1 | 6/2017 | Rolland et al. |
| 2017/0173881 A1 | 6/2017 | Dachs, II et al. |
| 2017/0182708 A1 | 6/2017 | Lin et al. |
| 2017/0210077 A1 | 7/2017 | Ermoshkin et al. |
| 2017/0239887 A1 | 8/2017 | Rolland et al. |
| 2017/0246660 A1 | 8/2017 | Thompson et al. |
| 2017/0246804 A1 | 8/2017 | El-Siblani et al. |
| 2017/0291356 A1 | 10/2017 | Adachi et al. |
| 2017/0297099 A1 | 10/2017 | Gibson et al. |
| 2017/0334129 A1 | 11/2017 | Ebert et al. |
| 2017/0342182 A1 | 11/2017 | Pesek et al. |
| 2017/0369633 A1 | 12/2017 | Caruso et al. |
| 2018/0001552 A1 | 1/2018 | Dachs, II et al. |
| 2018/0015669 A1 | 1/2018 | Moore et al. |
| 2018/0044448 A1 | 2/2018 | Moser et al. |
| 2018/0071977 A1 | 3/2018 | Tumbleston et al. |
| 2018/0079865 A1 | 3/2018 | Pyun et al. |
| 2018/0100037 A1 | 4/2018 | Pyun |
| 2018/0105649 A1 | 4/2018 | Pyun et al. |
| 2018/0126630 A1 | 5/2018 | Panzer et al. |
| 2018/0126631 A1 | 5/2018 | Nauka et al. |
| 2018/0133959 A1 | 5/2018 | Moore et al. |
| 2018/0162047 A1 | 6/2018 | Gibson et al. |
| 2018/0162048 A1 | 6/2018 | Gibson et al. |
| 2018/0194066 A1 | 7/2018 | Ramos et al. |
| 2018/0200948 A1 | 7/2018 | Kuijpers et al. |
| 2018/0208686 A1 | 7/2018 | Pyun et al. |
| 2018/0333911 A1 | 11/2018 | Lin |
| 2018/0333913 A1 | 11/2018 | Lin et al. |
| 2018/0348646 A1 | 12/2018 | Lin et al. |
| 2018/0361666 A1 | 12/2018 | Adzima |
| 2019/0134886 A1 | 5/2019 | Willis et al. |
| 2019/0176398 A1 | 6/2019 | Adzima |
| 2019/0210285 A1 | 7/2019 | Tomioka et al. |
| 2019/0212572 A1 | 7/2019 | Tomioka |
| 2019/0224918 A1 | 7/2019 | Zheng |
| 2019/0322033 A1 | 10/2019 | Willis et al. |
| 2020/0031044 A1 | 1/2020 | Lin et al. |

FOREIGN PATENT DOCUMENTS

| | | |
|---|---|---|
| CN | 101956091 A | 1/2011 |
| CN | 102171305 B | 7/2013 |
| CN | 103317140 A | 9/2013 |
| CN | 104609859 A | 5/2015 |
| CN | 104890245 A | 9/2015 |
| CN | 105081325 A | 11/2015 |
| CN | 105729812 A | 7/2016 |
| CN | 105922587 A | 9/2016 |
| CN | 104725050 B | 1/2017 |
| CN | 205889910 U | 1/2017 |
| CN | 104923781 B | 3/2017 |
| CN | 107573058 A | 1/2018 |
| CN | 110914058 A | 3/2020 |
| DE | 3926869 A1 | 2/1991 |
| EP | 3194145 A2 | 7/2017 |
| JP | 2010030322 A | 2/2010 |
| JP | 2017210620 A | 11/2017 |
| JP | 6241944 B2 | 12/2017 |
| KR | 20170005209 A | 1/2017 |
| WO | WO-0140866 A2 | 6/2001 |
| WO | WO-0200569 A2 | 1/2002 |
| WO | WO-2007020634 A2 | 2/2007 |
| WO | WO-2014126830 A2 | 8/2014 |
| WO | WO-2015031227 A1 | 3/2015 |
| WO | WO-2015107066 A1 | 7/2015 |
| WO | WO-2016022336 A2 | 2/2016 |
| WO | WO-2016094827 A1 | 6/2016 |
| WO | WO-2016123499 A1 | 8/2016 |
| WO | WO-2017009368 A1 | 1/2017 |
| WO | WO-2017011533 A1 | 1/2017 |
| WO | WO-2017051084 A1 | 3/2017 |
| WO | WO-2017053783 A1 | 3/2017 |
| WO | WO-2017066546 A1 | 4/2017 |
| WO | WO-2017112483 A2 | 6/2017 |
| WO | WO-2017112682 A1 | 6/2017 |
| WO | WO-2017112751 A1 | 6/2017 |
| WO | WO-2017210298 A1 | 12/2017 |
| WO | WO-2017214007 A1 | 12/2017 |
| WO | WO-2018006018 A1 | 1/2018 |
| WO | WO-2018006029 A1 | 1/2018 |
| WO | WO-2018047479 A1 | 3/2018 |
| WO | WO-2018081053 A1 | 5/2018 |
| WO | WO-2018094131 A1 | 5/2018 |
| WO | WO-2018102341 A1 | 6/2018 |
| WO | WO-2018106472 A1 | 6/2018 |
| WO | WO-2018213356 A1 | 11/2018 |
| WO | WO-2018232175 A1 | 12/2018 |
| WO | WO-2020139858 | 7/2020 |

OTHER PUBLICATIONS

U.S. Appl. No. 16/016,257 Notice of Allowance dated Jul. 17, 2019.
U.S. Appl. No. 16/016,257 Office Action dated Mar. 21, 2019.
U.S. Appl. No. 16/016,262 Notice of Allowance dated Jul. 5, 2019.
U.S. Appl. No. 16/016,262 Office Action dated Mar. 21, 2019.
U.S. Appl. No. 16/202,039 Office Action dated Apr. 15, 2020.
U.S. Appl. No. 16/276,148 Office Action dated May 20, 2019.
U.S. Appl. No. 16/276,148 Office Action dated Nov. 29, 2019.
U.S. Appl. No. 15/374,734 Office Action dated Sep. 6, 2019.
EP18801929.3 Extended European Search Report dated Feb. 17, 2021.
U.S. Appl. No. 16/016,253 Notice of Allowance dated Aug. 18, 2020.
U.S. Appl. No. 15/374,734 Office Action dated Sep. 4, 2020.
U.S. Appl. No. 16/202,039 Office Action dated Aug. 27, 2020.
Amine photochemical coinitiators, [online] [Retrieved on Aug. 4, 2014]; Retrieved from the Internet URL: httQ://www.sigmaaldrich.com/materials-science/material-scienceproducts. htrnl?TablePage=20204246; 2 pages.

(56) References Cited

OTHER PUBLICATIONS

"Anilox." Wikipedia, Wikimedia Foundation, May 16, 2018, en.wikipedia.org/wiki/Anilox.
Benoit, et al. Development of a universal alkoxyamine for 'living' free radical polymerizations. J. Am. Chem. Soc., 121 (1999): 3904-3920.
Berg, et al. A dual-cure, solid-state photoresist combining a thermoreversible Diels-Alder network and a chain growth acrylate network. Macromolecules, 47.10 (2014): 3473-3482.
"Capabilities." Technical Coatings International Capabilities, Mar. 14, 2017, http://www.tciinc.com/capabilities/.
Chen, et al. Novel multifunctional hyperbranched polymeric photoinitiators with built-in amine coinitiators for UV curing. J. Mater. Chem., 17 (2007): 3389-3392.
Coenen. Industry trends are boosting Jet Printing. 2015.
Corrales, et al. Free radical macrophotoinitiators: an overview on recent advances. Journal of Photochemistry and Photobiology A: Chemistry, 159 (2003): 103-114.
Deckers, et al. Additive Manufacturing of Ceramics: A Review, J. Ceram. Sci. Tech., 05 [04] 245-260 (2014).
Dendukuri, et al. Continuous-Flow Lithography for High-Throughput Microparticle Synthesis. Nature Materials, 5 (May 2006): 365-369.
Essemtec AG. Essemtec—Spider—Compact High Speed Jetter and Dispenser. YouTube Web Video. Published on Jul. 5, 2016. 2 pages. URL https://www.youtube.com/watch?v=NpgBurid2wU.
Essemtec AG. Essemtec Scorpion—Versatile High Speed Jetting of Solder Paste and Glue. YouTube Web Video. Published on Nov. 13, 2014. 2 pages. URL https://www.youtube.com/watch?v=SZ-Kq2Gkm5Y.
Fairbanks, et al. Photoinitiated polymerization ofPEG-diacrylate with lithium phenyl-2,4,6-trimethylbenzoylphosphinate: polymerization rate and cytocompatibility. Biomaterials, 30 (2009): 6702-6707.
"Flexography." Wikipedia, Wikimedia Foundation, May 23, 2018, en.wikipedia.org/wiki/Flexography.
German, et al. Injection Molding of Metals and Ceramics. Metal Powder Industries Federation, 1997.
Gonsalvi, et al. Novel synthetic pathways for bis(acyl)phosphine oxide photoinitiators. Angew. Chem. Int. Ed., 51 (2012): 7895-7897.
Green, Industrial photoinitiators—a technical guide, CRC Press,© 2010 Taylor and Francis Group, LLC, 191 pages.
Houben. Equipment for printing of high viscosity liquids and molten metals. Universiteit Twente. Sep. 27, 2012.
Ikemura, et al. Design of a new dental adhesive—effect of a water-soluble sodium acyl phosphine oxide with crown ether on adhesion to dental hard tissues. Dental Materials Journal, 28.3 (2009): 267-276.
Kloxin, et al. Photodegradable hydro gels for dynamic tuning of physical and chemical properties. Science, 324 (2009): 59-63.
Kyzen. Stencil Cleaning & Misprinted PCB Cleaners. 2018. http://www.kyzen.com/electronics-manufacturing-cleaning/stencils-and-misprints/.
Lambert, et al. Design considerations for mask projection microstereolithography systems. (Jun. 22, 2016) [online] (retrieved from https://sffsymposium.engr.utexas.edu/Manuscripts/2013/2013-09-Lambert.pdf), 20 pages.
Lee, et al. Solvent Compatibility of Poly(dimethylsiloxane)-Based Microfluidic Devices, Anal. Chem. 75 (2003): 6544-6554.
Massey, L. Permeability Properties of Plastics and Elastomers-A Guide to Packaging and Barrier Materials. Published Jan. 1, 2003. pp. 1-5, 19-29.
Matyjaszewski, et al. Atom transfer radical polymerization. Chem. Rev., 101 (2001): 2921-2990.
McDonald, et al. Fabrication ofmicrofluidic systems in poly(dimethylsiloxane). Electrophoresis, 21(2000): 27-40.
Miller. Slot Die Coating Technology. Aug. 3, 2009.
Moad, et al. Living radical polymerization by the RAFT process. Aust. J. Chem., 58 (2005): 379-410.
Murata, et al. Photopolymerization-induced phase separation in binary blends of photocurable/linear polymers. Polymer. vol. 43, Issue 9, Apr. 2002, pp. 2845-2859.
Myiconnect007. Taiyo's Inkjet Solder Mask Applied with Meyer Burger's PIXDRO IP410 Printer. YouTube Web Video. Published on Feb. 13, 2015. 2 pages. URL https://www.youtube.com/watch?v=jm_JteEkQWE.
Organic photoinitiators, [online] [Retrieved on Aug. 4, 2014]; Retrieved from the Internet URL: httQ://www.sigmaaldrich.com/materials-science/material-scienceproducts.html?TablePage=16374997; 1 page.
Otsu, et al. Polymer design by iniferter technique in radical polymerization: synthesis of AB and ABA block copolymers containing random and alternating copolymer se_guences. Polymer Journal, 17.1 (1985): 97-104.
Pan, et al. Rapid manufacturing in minutes: the development of a mask projection stereolithography process for high-speed fabrication. Proceedings of the ASME 2012 International Manufacturing Science and Engineering Conferences, Jun. 4-8, 2012, Notre Dame, Indiana, US, 10 pages.
PCT/US2018/032837 International Search Report and Written Opinion dated Sep. 24, 2018.
PCT/US2018/037630 International Search Report and Written Opinion dated Oct. 3, 2018.
Pinnau, et al. Gas and vapor properties of amorphous perfluorinated copolymer membranes based on 2,2-bistrifluoromethyl-4,5-difluoro-1,3-dioxole/tetrafluoroethylene. Journal of Membrane Science, 109: 125-133 (1996).
Raft agents, [online] [Retrieved on Aug. 4, 2014]; Retrieved from the Internet URL: h!!Q ://www.sigmaaldrich.com/materials-science/material-sc ienceproducts. htrnl?TablePage=I 03936134; 4 pages.
"Reverse Roll Coating." Wikipedia, Wikimedia Foundation, Apr. 10, 2018, en.wikipedia.org/wiki/Reverse_roll_coating.
Scott, et al. Two-color single-photon photoinitiation and photoinhibition for subdiffraction photolithography. Science, 324 (2009): 913-917.
"Screen Printing." Wikipedia, Wikimedia Foundation, May 17, 2018, en.Wikipedia.org/wiki/Screen_printing#1960s_to_present.
"Spin Coating." Wikipedia, Wikimedia Foundation, Apr. 10, 2018, en.wikipedia.org/wiki/Spin_coating.
Szczepanski, et al. A new approach to network heterogeneity: Polymerization Induced Phase Separation in photo-initiated, free-radical methacrylic systems. Polymer (Guildf). Sep. 28, 2012;53(21):4694-4701.
Temel, et al. Synthesis of main chain polymeric benzophenone photoinitiator via thiol-ene click chemistry and its use in free radical polymerization. J. Polym. Sci. A: Polym. Chem., 48 (2010): 5306-5312.
Unknown author, "DuPont™ Teflon® AF amorphous fluoroplastic resin," (Jun. 22, 2016) [online] (retrieved from http://www2.dupont.com/Teflon_Industrial/en_US/assets/downloads/h44587.pdf), 4 pages.
Unknown author, "Teflon™ AF amorphous fluoroplastic resins," (Jun. 22, 2016) [online] (retrieved from https://www.chemours.com/Teflon_Industrial/en_us/assets/downloads/teflon-af-product-information.pdf), 3 pages.
U.S. Appl. No. 14/711,703 Notice of Allowance dated Jun. 8, 2017.
U.S. Appl. No. 14/711,703 Office Action dated Apr. 22, 2016.
U.S. Appl. No. 14/711,703 Office Action dated Dec. 1, 2016.
U.S. Appl. No. 14/848,162 Notice of Allowance dated Oct. 3, 2018.
U.S. Appl. No. 14/848,162 Office Action dated Jun. 5, 2018.
U.S. Appl. No. 14/848,162 Office Action dated Sep. 18, 2017.
U.S. Appl. No. 14/967,055 Office Action dated May 19, 2017.
U.S. Appl. No. 14/967,055 Office Action dated Jul. 12, 2018.
U.S. Appl. No. 14/967,055 Office Action dated Nov. 1, 2017.
U.S. Appl. No. 15/983,962 Notice of Allowance dated Oct. 12, 2018.
U.S. Appl. No. 16/016,253 Office Action dated Oct. 16, 2018.
U.S. Appl. No. 16/016,257 Office Action dated Sep. 27, 2018.
U.S. Appl. No. 16/016,262 Office Action dated Sep. 28, 2018.
U.S. Appl. No. 16/049,288 Notice of Allowance dated Jan. 3, 2019.
U.S. Appl. No. 16/049,288 Office Action dated Oct. 11, 2018.
Varma et al. Solution Combustion Synthesis of Nanoscale Materials. Chem Rev. Dec. 14, 2016;116(23):14493-14586.

(56) References Cited

OTHER PUBLICATIONS

Wei, et al. A highly efficient polyurethane-type polymeric photoinitiator containing in-chain benzophenone and coinitiator amine for photopolymerization of PU prepolymers. Macromol. Chern. Phys., 207 (2006): 2321-2328.

Yang, et al. Synthesis of 1,6-hexanediol diacrylate, 2010.

Yang, H. et al. "High Viscosity Jetting System for 3d Reactive Inkjet Printing." (2013).

Zhang, Teflon AF composite materials in membrane separation and molecular recognition in fluorous media. Ph.D. dissertation, University of Pittsburgh, 2013, 207 pages.

U.S. Appl. No. 16/016,253 Notice of Allowance dated Oct. 2, 2020.

U.S. Appl. No. 15/919,124 Notice of Allowance dated Nov. 27, 2020.

U.S. Appl. No. 16/539,333 Office Action dated Jan. 7, 2021.

METHODS AND SYSTEMS FOR STEREOLITHOGRAPHY THREE-DIMENSIONAL PRINTING

CROSS-REFERENCE

This application is a continuation of U.S. patent application Ser. No. 16/276,148, filed on Feb. 14, 2019, which is a continuation of U.S. patent application Ser. No. 16/049,288, filed on Jul. 30, 2018, which is a continuation of International Application No. PCT/US2018/037630, filed on Jun. 14, 2018, which claims the benefit of U.S. Patent Application No. 62/521,117, filed on Jun. 16, 2017, which applications are incorporated herein by reference in their entirety.

BACKGROUND

Additive manufacturing techniques, such as three-dimensional (3D) printing, are rapidly being adopted as useful techniques for a number of different applications, including rapid prototyping and fabrication of specialty components. Examples of 3D printing include powder-based printing, fused deposition modeling (FDM), and stereolithography (SLA).

Photopolymer-based 3D printing technology (e.g., stereolithography) may produce a 3D structure in a layer-by-layer fashion by using light to selectively cure polymeric precursors into a polymeric material within a photoactive resin. Photopolymer-based 3D printers may project light through an optically transparent window of a vat containing photoactive resin to cure at least a portion of the resin. Such printers may build a 3D structure by forming one layer at a time, where a subsequent layer adheres to the previous layer.

SUMMARY

The present disclosure describes technologies relating to three-dimensional (3D) printing adhesion reduction using photoinhibition, and more specifically, the present disclosure describes using two lights with different wavelengths to respectively control a photopolymerization process within a mixture comprising a polymeric precursor. The present disclosure describes configurations for performing multi-material 3D printing, wherein one or more mixtures may be used to print a 3D structure.

Particular embodiments of the subject matter described in the present disclosure can be implemented to realize one or more of the following advantages. Adhesion at the interface between an optically transparent window and the mixture adjacent to the optically transparent window in a 3D printing system may be reduced by reducing an amount of incidental curing of the resin at a wavelength selected to cause photoinhibition in the resin. In some cases, reducing adhesion at the window-mixture interface increases the speed of printing a 3D printed structure in the 3D printing system by reducing a frequency with which at least a portion of the liquid resin in the reservoir must be refreshed. In some cases, a resolution of features of the 3D printed structure is improved by reducing incidental curing at the wavelength selected to cause photoinhibition.

An aspect of the present disclosure provides a method for printing a three-dimensional (3D) object, comprising: (a) providing, adjacent to a build surface, a mixture comprising (i) a polymeric precursor, (ii) a photoinitiator configured to initiate formation of a polymeric material from the polymeric precursor, and (iii) a photoinhibitor configured to inhibit formation of the polymeric material from the polymeric precursor; and (b) exposing the mixture to (i) a first light having a first wavelength sufficient to cause the photoinitiator to initiate formation of the polymeric material from the polymeric precursor at a location disposed away from the build surface, to print at least a portion of the 3D object, and (ii) a second light having a second wavelength sufficient to cause the photoinhibitor to inhibit formation of the polymeric material from the polymeric precursor at a location adjacent to the build surface, wherein during printing of the at least the portion of the 3D object, a ratio of (i) an energy of the second light sufficient to initiate formation of the polymeric material relative to (ii) an energy of the first light sufficient to initiate formation of the polymeric material is greater than 1.

In some embodiments, the ratio is greater than 5. In some embodiments, the ratio is greater than 10. In some embodiments, the ratio is greater than 20.

In some embodiments, an additional ratio of (i) a rate of formation of the polymeric material upon exposure to the first light relative to (ii) a rate of formation of the polymeric material upon exposure to the second light is greater than 1. In some embodiments, the additional ratio is greater than 5. In some embodiments, the additional ratio is greater than 10. In some embodiments, the additional ratio is greater than 20.

In some embodiments, the photoinhibitor is present in the mixture at an amount from 0.001% to 5% by weight. In some embodiments, the photoinhibitor comprises a hexaarylbiimidazole or a functional variant thereof. In some embodiments, the hexaarylbiimidazole comprises a phenyl group with a halogen and/or an alkoxy substitution. In some embodiments, the phenyl group comprises an ortho-chloro-substitution. In some embodiments, the phenyl group comprises an ortho-methoxy-substitution. In some embodiments, the phenyl group comprises an ortho-ethoxy-substitution.

In some embodiments, the photoinitiator is present in the mixture at an amount from 0.001% to 5% by weight. In some embodiments, the photoinitiator comprises camphorquinone or a functional variant thereof.

In some embodiments, the mixture further comprises a stabilizer configured to inhibit formation of the polymeric material from at least a portion of the polymeric precursor. In some embodiments, the stabilizer is present in the mixture at an amount from 0.0001% to 0.5% by weight. In some embodiments, the stabilizer is a radical inhibitor. In some embodiments, the radical inhibitor comprises phenothiazine or butylated hydroxytoluene.

In some embodiments, the mixture further comprises a co-initiator configured to initiate formation of the polymeric material from the polymeric precursor. In some embodiments, the co-initiator is present in the mixture at an amount from 0.01% to 3% by weight. In some embodiments, the co-initiator comprises a tertiary amine. In some embodiments, the co-initiator comprises an ethyl-dimethyl-amino benzoate or a functional variant thereof.

In some embodiments, the mixture further comprises a light absorber configured to absorb at least the first wavelength or the second wavelength. In some embodiments, the light absorber is present in the mixture at an amount from 0.001% to 5% by weight. In some embodiments, the light absorber is configured to absorb at the second wavelength. In some embodiments, exposing the mixture to the second light having the second wavelength initiates the light absorber to reduce an amount of the second light exposed to at least a portion of the mixture.

In some embodiments, the polymeric precursor comprises one or more acrylates.

In some embodiments, the polymeric precursor comprises monomers configured to polymerize to form the polymeric material. In some embodiments, the monomers are present in the mixture at an amount from 1% to 80% by weight. In some embodiments, the monomers comprise (i) tricyclodecanediol diacrylate, or a functional variant thereof, or (ii) phenoxy ethyl acrylate or a functional variant thereof.

In some embodiments, the polymeric precursor comprises one or more oligomers configured to cross-link to form the polymeric material. In some embodiments, the one or more oligomers are present in the mixture at an amount from 1% to 30% by weight. In some embodiments, the one or more oligomers comprises urethane (meth)acrylate, polyester urethane (meth)acrylate, epoxy(meth)acrylate, polyether (meth)acrylate, polyol (meth)acrylate, dendritic (meth)acrylate, silicone (meth)acrylate, polybutadiene (meth)acrylate, phenolic (meth)acrylate, or a combination thereof.

In some embodiments, the mixture further comprises one or more particles. In some embodiments, the one or more particles is present in the mixture at an amount from 10% to 97% by weight. In some embodiments, the one or more particles comprises at least one metal particle, at least one ceramic particle, or a combination thereof.

In some embodiments, the first wavelength and the second wavelength are different wavelengths. In some embodiments, the first wavelength is from 400 nanometers (nm) to 500 nm. The second wavelength may be from 300 nm to 400 nm.

In some embodiments, the method further comprises receiving or generating a computer model of the 3D object. In some embodiments, the at least the portion of the 3D object is in accordance to the computer model of the 3D object.

In some embodiments, the method further comprises repeating the steps (a) and (b) one or more times.

In some embodiments, the method further comprises providing a build head adjacent to the build surface. In some embodiments, the at least the portion of the 3D object is formed adjacent to the build head. In some embodiments, during formation of the at least the portion of the 3D object, the build head is moved along a direction away from the build surface.

In some embodiments, the build surface is part of a vat configured to contain the mixture. In some embodiments, the build surface is part of an open platform, and the method further comprises providing a film of the mixture adjacent to the open platform. In some embodiments, the build surface comprises a window. The method may further comprise directing the first light and the second light through the window and into the mixture.

Another aspect of the present disclosure provides a method for printing a three-dimensional (3D) object, comprising: (a) providing, adjacent to a build surface, a mixture comprising (i) a polymeric precursor, (ii) a photoinitiator configured to initiate formation of a polymeric material from the polymeric precursor, and (iii) a photoinhibitor configured to inhibit formation of the polymeric material from the polymeric precursor; and (b) exposing the mixture to (i) a first light having a first wavelength sufficient to cause the photoinitiator to initiate formation of the polymeric material from the polymeric precursor at a location disposed away from the build surface, to print at least a portion of the 3D object, and (ii) a second light having a second wavelength sufficient to cause the photoinhibitor to inhibit formation of the polymeric material from the polymeric precursor at a location adjacent to the build surface, wherein during printing of the at least the portion of the 3D object, a ratio of (i) a rate of formation of the polymeric material upon exposure to the first light relative to (ii) a rate of formation of the polymeric material upon exposure to the second light may be greater than 1. In some embodiments, the ratio is greater than 5. In some embodiments, the ratio is greater than 10. In some embodiments, the ratio is greater than 20.

Another aspect of the present disclosure provides a mixture for printing a three-dimensional (3D) object, comprising: a polymeric precursor; a photoinitiator configured to initiate formation of a polymeric material from the polymeric precursor upon exposure to a first light having a first wavelength; and a photoinhibitor configured to inhibit formation of the polymeric material from the polymeric precursor upon exposure to a second light having a second wavelength, wherein during printing of the at least the portion of the 3D object, a ratio of (i) an energy of the second light sufficient to initiate formation of the polymeric material relative to (ii) an energy of the first light sufficient to initiate formation of the polymeric material is greater than 1.

In some embodiments, the ratio is greater than 5. In some embodiments, the ratio is greater than 10. In some embodiments, the ratio is greater than 20.

In some embodiments, an additional ratio of (i) a rate of formation of the polymeric material upon exposure to the first light relative to (ii) a rate of formation of the polymeric material upon exposure to the second light is greater than 1. In some embodiments, the additional ratio is greater than 5. In some embodiments, the additional ratio is greater than 10. In some embodiments, the additional ratio is greater than 20.

In some embodiments, the mixture further comprises a stabilizer configured to inhibit formation of the polymeric material from at least a portion of the polymeric precursor. In some embodiments, the stabilizer is a radical inhibitor.

In some embodiments, the mixture further comprises a co-initiator configured to initiate formation of the polymeric material from the polymeric precursor. In some embodiments, the co-initiator comprises a tertiary amine.

In some embodiments, the mixture further comprises a light absorber configured to absorb at least the first wavelength or the second wavelength.

In some embodiments, the polymeric precursor comprises one or more acrylates. In some embodiments, the polymeric precursor comprises monomers configured to polymerize to form the polymeric material. In some embodiments, the polymeric precursor comprises oligomers configured to cross-link to form the polymeric material.

In some embodiments, the mixture further comprises one or more particles. In some embodiments, the one or more particles comprises at least one metal particle, at least one ceramic particle, or both.

In some embodiments, the first wavelength and the second wavelength are different wavelengths.

Another aspect of the present disclosure provides a mixture for printing a three-dimensional (3D) object, comprising: a polymeric precursor; a photoinitiator configured to initiate formation of a polymeric material from the polymeric precursor upon exposure to a first light having a first wavelength; and a photoinhibitor configured to inhibit formation of the polymeric material from the polymeric precursor upon exposure to a second light having a second wavelength, wherein during printing of the at least the portion of the 3D object, a ratio of (i) a rate of formation of the polymeric material upon exposure to the first light relative to (ii) a rate of formation of the polymeric material upon exposure to the second light may be greater than 1. In some embodiments, the ratio is greater than 5. In some embodiments, the ratio is greater than 10. In some embodiments, the ratio is greater than 20.

Another aspect of the present disclosure provides a system for printing a three-dimensional (3D) object, comprising: a build surface configured to support a mixture comprising (i) a polymeric precursor, (ii) a photoinitiator configured to initiate formation of a polymeric material from the polymeric precursor, and (iii) a photoinhibitor configured to inhibit formation of the polymeric material from the polymeric precursor; one or more optical sources; and a controller operatively coupled to the one or more optical sources, which controller is configured to direct the one or more optical sources to expose the mixture to (i) a first light having a first wavelength sufficient to cause the photoinitiator to initiate formation of the polymeric material from the polymeric precursor at a location disposed away from the build surface, to print at least a portion of the 3D object, and (ii) a second light having a second wavelength sufficient to cause the photoinhibitor to inhibit formation of the polymeric material from the polymeric precursor at a location adjacent to the build surface, wherein during printing of the at least the portion of the 3D object, a ratio of (i) an energy of the second light sufficient to initiate formation of the polymeric material relative to (ii) an energy of the first light sufficient to initiate formation of the polymeric material is greater than 1.

In some embodiments, the ratio is greater than 5. In some embodiments, the ratio is greater than 10. In some embodiments, the ratio is greater than 20.

In some embodiments, an additional ratio of (i) a rate of formation of the polymeric material upon exposure to the first light relative to (ii) a rate of formation of the polymeric material upon exposure to the second light is greater than 1. In some embodiments, the additional ratio is greater than 5. In some embodiments, the additional ratio is greater than 10. In some embodiments, the additional ratio is greater than 20.

In some embodiments, during use, the mixture further comprises a stabilizer configured to inhibit formation of the polymeric material from at least a portion of the polymeric precursor. In some embodiments, the stabilizer is a radical inhibitor.

In some embodiments, during use, the mixture further comprises a co-initiator configured to initiate formation of the polymeric material from the polymeric precursor. In some embodiments, the co-initiator comprises a tertiary amine.

In some embodiments, during use, the mixture further comprises a light absorber configured to absorb at least the first wavelength or the second wavelength.

In some embodiments, the polymeric precursor comprises monomers configured to polymerize to form the polymeric material. In some embodiments, the polymeric precursor comprises oligomers configured to cross-link to form the polymeric material.

In some embodiments, during use, the mixture further comprises one or more particles.

In some embodiments, the first wavelength and the second wavelength are different wavelengths.

In some embodiments, the controller is configured to receive or generate a computer model of the 3D object. In some embodiments, the at least the portion of the 3D object is in accordance to the computer model of the 3D object.

In some embodiments, the system further comprises a build head arranged to move along a direction away from the build surface during formation of the at least the portion of the 3D object.

In some embodiments, the build head is configured to support the at least the portion of the 3D object.

In some embodiments, the build surface is a part of a vat configured to contain the mixture.

In some embodiments, the build surface is a part of an open platform configured to support a film of the mixture adjacent to the open platform. In some embodiments, the system further comprises a deposition head configured to generate the film of the mixture over the build surface.

In some embodiments, the build surface comprises a window. In some embodiments, the controller is configured to direct the one or more optical sources to expose the first light and the second light through the window and into the mixture.

Another aspect of the present disclosure provides a system for printing a three-dimensional (3D) object, comprising: a build surface configured to support a mixture comprising (i) a polymeric precursor, (ii) a photoinitiator configured to initiate formation of a polymeric material from the polymeric precursor, and (iii) a photoinhibitor configured to inhibit formation of the polymeric material from the polymeric precursor; one or more optical sources; and a controller operatively coupled to the one or more optical sources, which controller is configured to direct the one or more optical sources to expose the mixture to (i) a first light having a first wavelength sufficient to cause the photoinitiator to initiate formation of the polymeric material from the polymeric precursor at a location disposed away from the build surface, to print at least a portion of the 3D object, and (ii) a second light having a second wavelength sufficient to cause the photoinhibitor to inhibit formation of the polymeric material from the polymeric precursor at a location adjacent to the build surface, wherein during printing of the at least the portion of the 3D object, a ratio of (i) a rate of formation of the polymeric material upon exposure to the first light relative to (ii) a rate of formation of the polymeric material upon exposure to the second light may be greater than 1. In some embodiments, the ratio is greater than 5. In some embodiments, the ratio is greater than 10. In some embodiments, the ratio is greater than 20.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
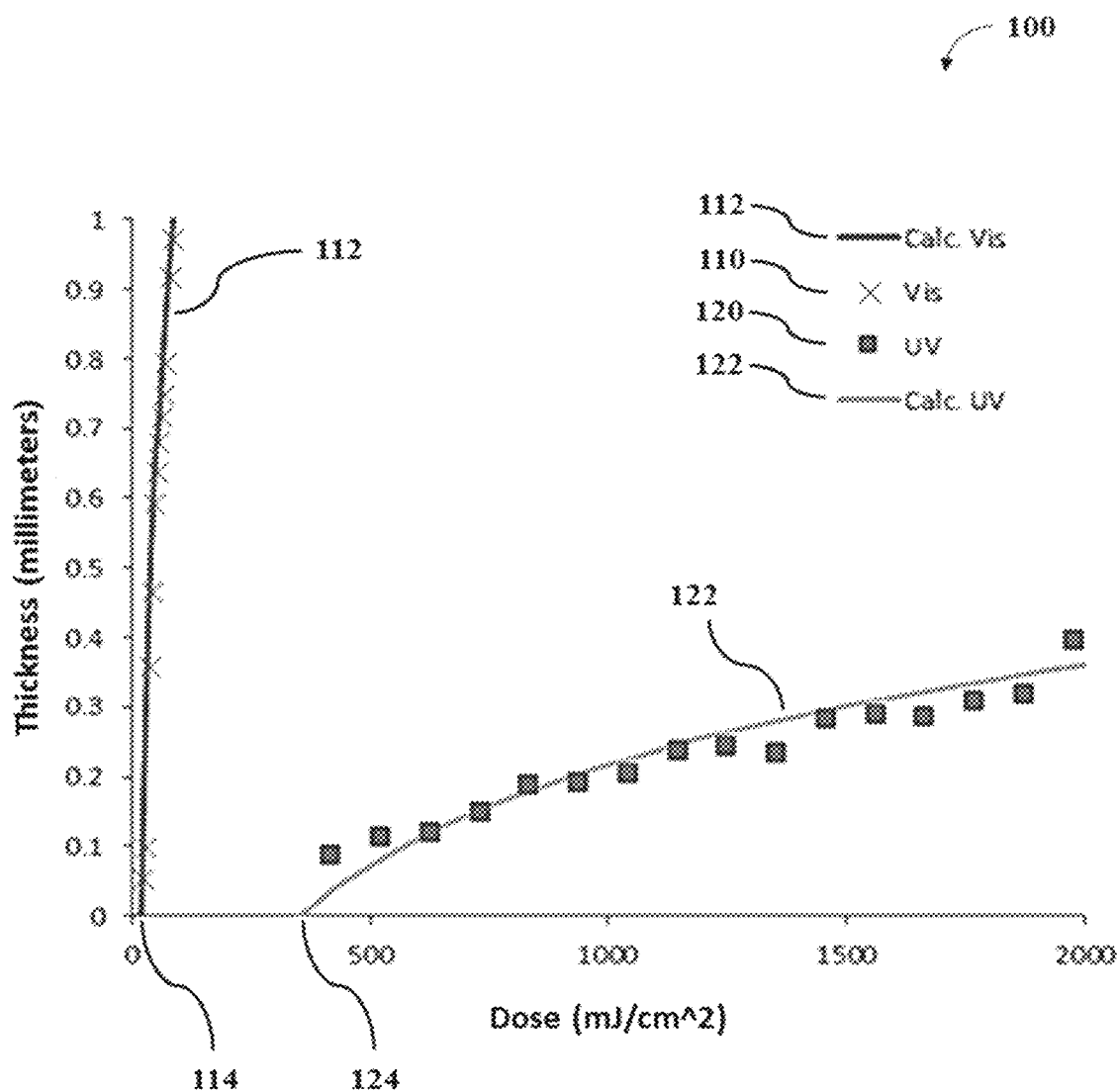
FIG. 1 shows an example working curve of a mixture under a photoinitiation light and a photoinhibition light.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "three-dimensional object" (also "3D object"), as used herein, generally refers to an objector apart of an object that is printed by three-dimensional (3D) printing. The 3D object may be at least a portion of a larger 3D object or an entirety of the 3D object. The 3D object may be fabricated (e.g., printed) in accordance with a computer model of the 3D object.

The term "mixture," as used herein, generally refers to a material that is usable to print a 3D object. The mixture may be referred to as a liquid or resin. In some cases, the mixture may be held inside a vat. A layer of the mixture to be subjected to the light may be confined between a bottom of the vat (e.g., a window) and the build head. The bottom of the vat may be a build surface. Alternatively, a layer of the mixture to be subjected to the light may be confined between the build head and the surface of the mixture. The surface of the mixture may be a build surface. In some cases, the mixture may be deposited on or adjacent to an open platform. A layer of the mixture to be subjected to the light may be defined by pressing the mixture (e.g., by a blade or a build head) into a film of the mixture. The open platform may be a build surface. In the embodiments described herein, a thickness of the layer of the mixture may be adjustable.

The mixture may include a photoactive resin. The photoactive resin may include a polymerizable and/or cross-linkable component (e.g., a precursor) and a photoinitiator that activates curing of the polymerizable and/or cross-linkable component, to thereby subject the polymerizable and/or cross-linkable component to polymerization and/or cross-linking. The photoactive resin may include a photoinhibitor that inhibits curing of the polymerizable and/or cross-linkable component. The 3D printing may be performed with greater than or equal to about 1, 2, 3, 4, 5, 6, 7, 8, 9, 10 or more mixtures. As an alternative, the 3D printing may be performed with less than or equal to about 10, 9, 8, 7, 6, 5, 4, 3, 2 mixtures, or no mixture (e.g., a single component). A plurality of mixtures may be used for printing a multi-material 3D object.

In some cases, the mixture may include a plurality of particles (e.g., metal, non-metal, or a combination thereof). The mixture may be a slurry or a paste. The plurality of particles may be solids or semi-solids (e.g., gels). The plurality of particles may be suspended throughout the mixture in a monodisperse distribution or a polydisperse distribution.

The term "particles," as used herein, generally refers to any particulate material that may be melted or sintered (e.g., not completely melted). The particulate material may be in powder form. The particles may be inorganic materials. The inorganic materials may be metallic (e.g., aluminum or titanium), intermetallic (e.g., steel alloys), ceramic (e.g., metal oxides) materials, or any combination thereof. In some cases, the term "metal" or "metallic" may refer to both metallic and intermetallic materials. The metallic materials may include ferromagnetic metals (e.g., iron and/or nickel). The particles may have various shapes and sizes. For example, a particle may be in the shape of a sphere, cuboid, or disc, or any partial shape or combination of shapes thereof. The particle may have a cross-section that is circular, triangular, square, rectangular, pentagonal, hexagonal, or any partial shape or combination of shapes thereof. Upon heating, the particles may sinter (or coalesce) into a solid or porous object that may be at least a portion of a larger 3D object or an entirety of the 3D object. The 3D printing may be performed with at least about 1, 2, 3, 4, 5, 6, 7, 8, 9, 10 or more types of particles. As an alternative, the 3D printing may be performed with less than or equal to about 10, 9, 8, 7, 6, 5, 4, 3, 2, or 1 particle, or no particles.

The term "photoinitiation," as used herein, generally refers to a process of subjecting a portion of a mixture to a light to cure (or gel) a photoactive resin in the portion of the mixture. The light (photoinitiation light) may have a wavelength that activates a photoinitiator that initiates curing of a polymerizable and/or cross-linkable component in the photoactive resin.

The term "photoinhibition," as used herein, generally refers to a process of subjecting a portion of a mixture to a light to inhibit curing of a photoactive resin in the portion of the mixture. The light (photoinhibition light) may have a wavelength that activates a photoinhibitor that inhibit curing of a polymerizable and/or cross-linkable component in the photoactive resin. The wavelength of the photoinhibition light and another wavelength of a photoinitiation light may be different wavelengths. In some examples, the photoinhibition light and the photoinitiation light may be projected from the same optical source. In some examples, the photoinhibition light and the photoinitiation light may be projected from different optical sources.

The terms "photoinitiation light" and "first light" may be used synonymously herein. The terms "photoinhibition light" and "second light" may be used synonymously herein.

The terms "energy," as used herein, generally refers to an electromagnetic (e.g., ultraviolet ray or visible light) exposure per unit area (e.g., millijoule per square centimeter; $mJ/cm^2$). The term "intensity," as used herein, generally refers to the energy (as described above) per time (e.g., milliwatt per square centimeter; mW/cm$^2$).

The term "vat," as used herein, generally refers to a structure (e.g., a container, holder, reservoir, etc.) that holds a mixture during 3D printing. The mixture may be usable for 3D printing. One or more sides of the vat (e.g., a bottom or side surface) may include an optically transparent or semi-transparent window (e.g., glass or a polymer) to direct light through the window and to the mixture. In some cases, the window may be precluded. In such a scenario, light may be provided to the mixture from above the vat, and it may be desirable to prevent curing of a portion of the mixture adjacent to the surface of the mixture.

The term "open platform," as used herein, generally refers to a structure that supports a mixture or a film of the mixture during 3D printing. The mixture may have a viscosity that is sufficient to permit the mixture to remain on or adjacent to the open platform during 3D printing. The open platform may be flat. The open platform may include an optically transparent or semi-transparent print window (e.g., glass or a polymer) to direct light through the window and to the mixture or the film of the mixture. In some cases, the window may be precluded. In such a scenario, light may be provided to the mixture of the film of the mixture from above the open platform, such as directly above or from a side of the open platform.

The term "window," as used herein, generally refers to a structure that is part of a vat or a container. In some cases, the window may be in contact with the mixture. In some cases, the window may not be in contact with the mixture. The window may be transparent or semitransparent (translucent). The window may be comprised of an optical window material, such as, for example, glass or a polymeric material (e.g., polymethylmethacrylate (PMMA)). In some cases, the window may be comprised of polydimethylsiloxane (PDMS) or other polymeric materials that are permeable to oxygen. During printing, the oxygen dissolved in the window may (i) diffuse into a contact surface between the window and the mixture comprising the photoactive resin (the window-mixture interface) and (ii) inhibit curing of the photoactive resin at the contact surface. The window may be positioned above an optical source for photopolymer-based 3D printing using bottom-up illumination. As an alternative, the window may be positioned below the optical source. As another alternative, the window may be positioned between a first optical source and a second optical source.

The term "build head," as used herein, generally refers to a structure that supports and/or holds at least a portion (e.g., a layer) of a 3D object. The build head may be configured to move along a direction away from a bottom of a vat or an open platform. Such movement may be relative movement, and thus the moving piece may be (i) the build head, (ii) the vat or the open platform, or (iii) both. The moving piece may comprise a mechanical gantry capable of motion in one or more axes of control (e.g., one or more of the XYZ planes) via one or more actuators during 3D printing.

Methods for 3D Printing

An aspect of the present disclosure provides methods for printing a 3D object. Methods of the present disclosure may be implemented using systems provided herein, such as, for example, the system 300 of FIG. 3 or the system 400 of FIG. 4.

A method for printing a 3D object may comprise (a) providing, adjacent to a build surface, a mixture comprising (i) a polymeric precursor, (ii) a photoinitiator configured to initiate formation of a polymeric material from the polymeric precursor, and (iii) a photoinhibitor configured to inhibit formation of the polymeric material from the polymeric precursor. The mixture may be exposed to (i) a first light having a first wavelength sufficient to cause the photoinitiator to initiate formation of the polymeric material from the polymeric precursor at a location disposed away from the build surface, to print at least a portion of the 3D object, and (ii) a second light having a second wavelength sufficient to cause the photoinhibitor to inhibit formation of the polymeric material from the polymeric precursor at a location adjacent to the build surface. During printing of the at least the portion of the 3D object, a ratio of (i) an energy of the second light sufficient to initiate formation of the polymeric material relative to (ii) an energy of the first light sufficient to initiate formation of the polymeric material may be greater than 1. Such energy may be an activation energy.

In some cases, the second light having the second wavelength may not cause (e.g., activate) the photoinitiator to initiate formation of the polymeric material from the polymeric precursor. In an example, the photoinitiator may not absorb at the second wavelength of the second light, or one or more other wavelengths of the second light. In such a scenario, the energy of the second light sufficient to initiate formation of the polymeric material from the polymeric precursor in the mixture may considered to be positive infinity. Thus, the ratio of (i) the energy of the second light sufficient to initiate formation of the polymeric material relative to (ii) the energy of the first light sufficient to initiate formation of the polymeric material may be substantially greater than 1.

In some cases, the second light having the second wavelength may cause the photoinitiator to initiate formation of the polymeric material from the polymeric precursor. The photoinitiator may be activated by absorbing at the second wavelength of the second light, or one or more other wavelengths of the second light. The photoinitiator may be activatable by alternative activation pathways, such as an energy transfer (e.g., Förster resonance energy transfer (FRET)) from another component in the mixture (e.g., a dye) that absorbs at the second wavelength of the second light, or at the one or more other wavelengths of the second light. Since the entire build surface may be exposed or flooded by the second light during printing the 3D object, such activation of the photoinitiator by the second light may yield (i) undesirable formation of the polymeric material at the location adjacent to the build surface and (ii) adhesion of the at least the portion of the 3D object to the build surface during printing. Such adhesion may reduce the speed of printing the 3D object or result in a print failure. Thus, to prevent formation of the polymeric material via the second light, it may be desirable that (i) the energy of the second light sufficient to initiate formation of the polymeric is greater than (ii) the energy of the first light sufficient to initiate formation of the polymeric material.

In some cases, the ratio of (i) the energy of the second light sufficient to initiate formation of the polymeric material relative to (ii) the energy of the first light sufficient to initiate formation of the polymeric material is greater than at least about 1, 2, 3, 4, 5, 6, 7, 8, 9, 10, 11, 12, 13, 14, 15, 16, 17, 18, 19, 20, 25, 30, 40, 50, 100, or more. In an example, the ratio is greater than 1. In another example, the ratio is greater than 5. In another example, the ratio is greater than 10. In another example, the ratio is greater than 20. As an alternative, the ratio may be less than or equal to about 100, 50, 40, 30, 25, 20, 19, 18, 17, 16, 15, 14, 13, 12, 11, 10, 9, 8, 7, 6, 5, 4, 3, or 2.

The amount of energy of the light (the first or second light) sufficient to initiate formation of the polymeric material within at least a portion of the mixture may be referred to as a critical energy ($E_C$) of the light ($\lambda_n$) for the mixture. As such, a ratio of (i) the critical energy ($E_{C,\lambda_2}$) sufficient to initiate formation of the polymeric material upon exposure to the second light ($\lambda_2$) relative to (ii) the critical energy ($E_{C,\lambda_1}$) sufficient to initiate formation of the polymeric material upon exposure to the first light ($\lambda_1$) may be greater than at least about 1, 2, 3, 4, 5, 6, 7, 8, 9, 10, 11, 12, 13, 14, 15, 16, 17, 18, 19, 20, 25, 30, 40, 50, 100, or more. In an example, the ratio between the two critical energies is greater than 5. In another example, the ratio between the two critical energies is greater than 10. In another example, the ratio between the two critical energies is greater than 20. As an alternative, the ratio between the two critical energies may be less than or equal to about 100, 50, 40, 30, 25, 20, 19, 18, 17, 16, 15, 14, 13, 12, 11, 10, 9, 8, 7, 6, 5, 4, 3, or 2.

This ratio may be described by the figure of merit, as shown in Equation 1:

$$\text{Figure of merit} = \frac{E_{C,\lambda_2}}{E_{C,\lambda_1}} \quad \text{(Equation 1)}$$

In some cases, the higher the value of the figure of merit, the more contrast there may be between the photoinitiation and the photoinhibition processes during the 3D printing.

For each light, the formation of the polymeric material from the polymeric precursor in the mixture may be described by a working curve equation (Equation 2) based on a modified form of the Beer-Lambert law that uses energy in an analogy to the intensity of the light:

$$l = d_p \ln\left[\frac{E}{E_c}\right] \quad \text{(Equation 2)}$$

A thickness (l) of a printed film (e.g., each layer of the 3D object) may be described as a function of the penetration depth of the light into the mixture ($d_p$), a total dose of energy supplied to the system (E), and the critical energy ($E_C$) of the light for the mixture. In an example, the working curve of a mixture using a light (e.g., the photoinitiation light or the photoinhibition light) may be obtained by: (a) placing a transparent or semi-transparent substrate (e.g., a glass slide) on the build surface comprising a window; (b) depositing a layer (e.g., film, coating, etc.) of the mixture comprising a photoactive resin on or adjacent to the substrate; (c) directing a series of the light through the window, through the substrate, and into the layer of the mixture, such that different positions of the layer of the mixture receive a wide range of discrete doses of the light or energies from the light; (d) washing off any excess mixture that is uncured; and (e) measuring (e.g., via a micrometer) the height (thickness) of any polymeric materials in the different positions of the layer. The height (y-axis) of the materials in the different positions of the layer may be plotted against the doses of the light (x-axis) directed towards the different positions of the layer. In such plot, the critical energy ($E_C$) of the light for the mixture may be the value of the light doses at the x-intercept.

In some cases, during obtaining the working curve, the mixture may not comprise a photoinhibitor. In other cases, the mixture may comprise one or more photoinhibitors to determine the effect of the one or more photoinhibitors on the working curve of the mixture. In some cases, the transparent or semi-transparent substrate may not be oxygen permeable as oxygen may act as an inhibitor of radical polymerization. In other cases, the transparent or semi-transparent substrate may be oxygen permeable to determine the effect of different substrates on the working curve of the mixture.

In some cases, the figure of merit (Equation 1) may affect the speed of printing the at least the portion of the 3D object. In an example, the first light (photoinitiation light) may have a first wavelength of 460 nanometers (nm), and the second light (photoinhibition light) may have a second wavelength of 365 nm. The ratio of the critical energies of the two lights for a mixture may be denoted as r:

$$r = \frac{E_{C,365\,nm}}{E_{C,460\,nm}} \quad \text{(Equation 3)}$$

The photoinitiation and the photoinhibition lights may be projected through a window of a vat containing the mixture, and a printed part that is on or adjacent to a build head may be lifted at a constant rate in a direction away from the window to yield a continuous 3D printing. A surface of the window in contact with the mixture may be a build surface. A portion of the mixture adjacent to the build surface may be a photoinhibition layer. Another potion of the mixture at a location disposed away from the build surface (adjacent to the photoinhibition layer) may be a photoinitiation layer. In such a scenario, an analogous equation to Equation 2 may be derived to determine a maximum speed ($v_{max}$) of 3D printing. This may be achieved by integrating the amount of energy absorbed by an infinitely thin photoinitiation layer adjacent to the photoinhibition layer having a thickness ($\delta$ to infinity):

$$\int_0^{E_{c,460}} dE = \frac{I_{460}}{v_{max}} \int_\delta^\infty \exp\left[\frac{-x}{d_p}\right] dx \quad \text{(Equation 4)}$$

where $I_{460}$ is an intensity of the photoinitiation light. Equation 4 may be solved for $v_{max}$ as shown in Equation 5:

$$v_{max} = \frac{I_{460} \cdot d_p}{E_{c,460}} e^{\left[\frac{-\delta}{d_p}\right]} \quad \text{(Equation 5)}$$

In some cases, a dose of the photoinitiation light greater than the critical energy of the photoinitiation light for the mixture ($E_{C,\lambda_1\,or\,460\,nm}$) may be used for the 3D printing, and thus the 3D printing speed (v) may be described as shown in Equation 6:

$$v = \frac{I_{460} \cdot d_p}{f_1 E_{c,460}} e^{\left[\frac{-\delta}{d_p}\right]} \quad \text{(Equation 6)}$$

where $f_1$ is a constant to relate (i) the dose of the photoinitiation light used for the 3D printing to (ii) the critical energy of the photoinitiation light for the mixture. In some cases, the value of $f_1$ ranges from about 1 to about 10. In some cases, the value of $f_1$ is greater than or equal to about 1, 2, 3, 4, 5, 6, 7, 8, 9, 10 or more. As an alternative, the value of $f_1$ may be less than or equal to about 10, 9, 8, 7, 6, 5, 4, 3, 2, 1, or less.

In some cases, the photoinitiation and the photoinhibition lights may be projected through the window of the vat containing the mixture, and the printed part that is on or adjacent to the build head may be lifted at a pseudo-constant rate in a direction away from the window to yield a semi-continuous 3D printing. In an example, the 3D printing process may (i) print at least a portion of the 3D object for a time period, (ii) stop printing (i.e., halt exposure to light) to move the at least the portion of the 3D object part away from the window (i.e., the build surface) and bring additional uncured mixture to the window, and (iii) initiate printing a subsequent layer of the 3D object. As such, an equation may be generated to describe an average speed ($v_{avg}$) of 3D printing over the entire duration of the 3D printing. This may be achieved by dividing a total distance printed by a sum of the exposure time ($t_{exp}$) and the separation time ($t_{sep}$):

$$v_{avg} = \frac{v \cdot t_{exp}}{t_{exp} + t_{sep}} \qquad \text{(Equation 7)}$$

where v is the 3D printing speed from Equation 6. In some cases, for a reliable 3D printing process, the exposure dose of the light may be a fraction ($f_2$) of the critical energy of the photoinhibition light at the wavelength of 365 nm ($E_{C,\ 365\ nm}$). Thus, the exposure time may be described as:

$$t_{exp} = \frac{f_2 \cdot E_{C,365\ nm}}{I_{365\ nm}} \qquad \text{(Equation 8)}$$

where $I_{365\ nm}$ is the intensity of the photoinhibition light having the wavelength of 365 nm. Equations 3, 7, and 8 may be combined to generate the following equation to describe the average speed ($v_{avg}$) of 3D printing as a function of the ratio r and the photoinitiation and the photoinhibition lights:

$$v_{avg} = \frac{I_{460} \cdot d_p \cdot e^{\left(\frac{-\hat{c}}{d_p}\right)}}{f_1 \cdot E_{C,460\ nm} + f_1 \cdot I_{373} \cdot \frac{t_{sep}}{r \cdot f_2}} \qquad \text{(Equation 9)}$$

In some cases, based on Equation 9, the average speed ($v_{avg}$) of 3D printing using the multi-wavelength method (i.e., using the photoinitiation and the photoinhibition lights) may increase as (i) the critical energy of the photoinitiation light for the mixture ($E_{C,\lambda_1}$ or $E_{C,460nm}$) decreases and/or (ii) the ratio (r) of the critical energies of the two lights for the mixture (as described in Equations 1 and 3) increases. Alternatively or in addition to, the average speed ($v_{avg}$) of 3D printing using the multi-wavelength method may be related to the intensity of the photoinitiation light ($I_{\lambda_1}$ or $I_{460}$), and inversely related to the intensity of the photoinhibition light ($I_{\lambda_2}$ or $I_{365}$).

In some cases, the method for printing the 3D object may be described by a rate of formation of the polymeric material from the polymeric precursor upon exposure to the light. The rate of formation of the polymeric material upon exposure to the light may be inversely proportional to the energy of the light sufficient to initiate formation of the polymeric material. Thus, a ratio of (i) a rate of formation of the polymeric material upon exposure to the photoinitiation light (first light) relative to (ii) a rate of formation of the polymeric material upon exposure to the photoinhibition light (second light) may be greater than at least about 1, 2, 3, 4, 5, 6, 7, 8, 9, 10, 11, 12, 13, 14, 15, 16, 17, 18, 19, 20, 25, 30, 40, 50, 100, or more. In an example, the ratio is greater than 5. In another example, the ratio is greater than 10. In another example, the ratio is greater than 20. As an alternative, the ratio may be less than or equal to about 100, 50, 40, 30, 25, 20, 19, 18, 17, 16, 15, 14, 13, 12, 11, 10, 9, 8, 7, 6, 5, 4, 3, or 2.

In some cases, the method for printing the 3D object may be described by a time needed or sufficient to initiate formation of the polymeric material from the polymeric precursor upon exposure to the light. The time sufficient to initiate formation of the polymeric material upon exposure to the light may be proportional to the energy of the light sufficient to initiate formation of the polymeric material. Thus, a ratio of (i) a time sufficient to initiate formation of the polymeric material upon exposure to the photoinhibition light (second light) relative to (ii) a time sufficient to initiate formation of the polymeric material upon exposure to the photoinitiation light (first light) may be greater than at least about 1, 2, 3, 4, 5, 6, 7, 8, 9, 10, 11, 12, 13, 14, 15, 16, 17, 18, 19, 20, 25, 30, 40, 50, 100, or more. In an example, the ratio is greater than 5. In another example, the ratio is greater than 10. In another example, the ratio is greater than 20. As an alternative, the ratio may be less than or equal to about 100, 50, 40, 30, 25, 20, 19, 18, 17, 16, 15, 14, 13, 12, 11, 10, 9, 8, 7, 6, 5, 4, 3, or 2.

The critical energy of the light sufficient to initiate formation of the polymeric material from the polymeric precursor may depend on a myriad of factors. Additionally, the rate of formation of the polymeric material upon exposure to the light and/or the time sufficient to initiate formation of the polymeric material upon exposure to the light may depend on the myriad of factors. Examples of the factors include intensity of the light, temperature of the mixture, and compositions of the mixture (e.g., polymeric precursors, photoinitiators, photoinhibitors, co-initiators for curing, other light absorbers, radical inhibitors, organic and/or inorganic particulate materials, solvent, etc.).

In some cases, the photoinhibitor may be present in the mixture at an amount from about 0.001 percent by weight (wt. %) to about 5 wt. %. The photoinhibitor may be present in the mixture at amount greater than or equal to about 0.001 wt. %, 0.002 wt. %, 0.003 wt. %, 0.004 wt. %, 0.005 wt. %, 0.006 wt. %, 0.007 wt. %, 0.008 wt. %, 0.009 wt. %, 0.01 wt. %, 0.02 wt. %, 0.03 wt. %, 0.04 wt. %, 0.05 wt. %, 0.1 wt. %, 0.5 wt. %, 1 wt. %, 5 wt. %, or more. The photoinhibitor may be present in the mixture at an amount less than or equal to about 5 wt. %, 1 wt. %, 0.5 wt. %, 0.1 wt. %, 0.05 wt. %, 0.04 wt. %, 0.03 wt. %, 0.02 wt. %, 0.01 wt. %, 0.009 wt. %, 0.008 wt. %, 0.007 wt. %, 0.006 wt. %, 0.005 wt. %, 0.004 wt. %, 0.003 wt. %, 0.002 wt. %, 0.001 wt. %, or less.

Some photoactivated radicals can preferentially terminate free radical polymerization, rather than initiating polymerizations, and the species that become such photoactivated radicals upon photoactivation may be used as photoinhibitors. In an example, ketyl radicals may terminate rather than initiate photopolymerizations. Most controlled radical polymerization techniques utilize a radical species that selectively terminates growing radical chains. Examples of such radical species include sulfanylthiocarbonyl and other radicals generated in photoiniferter (photo-initiator, transfer agent, and terminator) mediated polymerizations; sulfanyl-thiocarbonyl radicals used in reversible addition-fragmentation chain transfer polymerization; and nitrosyl radicals used in nitroxide mediate polymerization. In addition, lophyl radicals may be non-reactive towards the polymerization of acrylates in the absence of strong chain transfer agents. Other non-radical species that may be generated to terminate growing radical chains may include the numerous metal/ligand complexes used as deactivators in atom-transfer radical polymerization (ATRP). Non-limiting examples of the photoinhibitor include thiocarbamates, xanthates, dithiobenzoates, photoinititators that generate ketyl and other radicals that tend to terminate growing polymer chains radicals (i.e., camphorquinone and benzophenones), ATRP deactivators, and polymeric versions thereof.

In some cases, the photoinhibitor may comprise a hexaarylbiimidazole (HABI) or a functional variant thereof. In some cases, the hexaarylbiimidazole may comprise a phenyl group with a halogen and/or an alkoxy substitution. In an example, the phenyl group comprises an ortho-chloro-substitution. In another example, the phenyl group comprises an ortho-methoxy-substitution. In another example, the phenyl group comprises an ortho-ethoxy-substitution. Examples of the functional variants of the hexaarylbiimidazole include: 2,2'-Bis(2-chlorophenyl)-4,4',5,5'-tetraphenyl-1,2'-biimidazole; 2-(2-methoxyphenyl)-1-[2-(2-methoxyphenyl)-4,5-diphenyl-2H-imidazol-2-yl]-4,5-diphenyl-1H-imidazole; 2-(2-ethoxyphenyl)-1-[2-(2-ethoxyphenyl)-4,5-diphenyl-2H-imidazol-2-yl]-4,5-diphenyl-1H-imidazole; and 2,2',4-tris-(2-Chlorophenyl)-5-(3,4-dimethoxyphenyl)-4',5'-diphenyl-1,1'-biimidazole.

Other examples of the photoinhibitor in the mixture include one or more of: zinc dimethyl dithiocarbamate:zinc dimethyl dithiocarbamate; zinc diethyl dithiocarbamate; zinc dibutyl dithiocarbamate; nickel dibutyl dithiocarbamate; zinc dibenzyl dithiocarbamate; tetramethylthiuram disulfide; tetraethylthiuram disulfide (TEDS); tetramethylthiuram monosulfide; tetrabenzylthiuram disulfide; tetraisobutylthiuram disulfide; dipentamethylene thiuram hexasulfide; N,N'-dimethyl N,N'-di(4-pyridinyl)thiuram disulfide; 3-Butenyl 2-(dodecylthiocarbonothioylthio)-2-methylpropionate; 4-Cyano-4-[(dodecylsulfanylthiocarbonyl) sulfanyl]pentanoic acid; 4-Cyano-4-[(dodecylsulfanylthiocarbonyl)sulfanyl]pentanol; Cyanomethyl dodecyl trithiocarbonate; Cyanomethyl [3-(trimethoxysilyl)propyl] trithiocarbonate; 2-Cyano-2-propyl dodecyl trithiocarbonate; S,S-Dibenzyl trithiocarbonate; 2-(Dodecylthiocarbonothioylthio)-2-methylpropionic acid; 2-(Dodecylthiocarbonothioylthio)-2-methylpropionic acid N-hydroxysuccinimide; Benzyl 1H-pyrrole-1-carbodithioate; Cyanomethyl diphenylcarbamodithioate; Cyanomethyl methyl(phenyl)carbamodithioate; Cyanomethyl methyl(4-pyridyl)carbamodithioate; 2-Cyanopropan-2-yl N-methyl-N-(pyridin-4-yl)carbamodithioate; Methyl 2-[methyl(4-pyridinyl)carbamothioylthio]propionate; 1-Succinimidyl-4-cyano-4-[N-methyl-N-(4-pyridyl)carbamothioylthio] pentanoate; Benzyl benzodithioate; Cyanomethyl benzodithioate; 4-Cyano-4-(phenylcarbonothioylthio)pentanoic acid; 4-Cyano-4-(phenylcarbonothioylthio)pentanoic acid N-succinimidyl ester; 2-Cyano-2-propyl benzodithioate; 2-Cyano-2-propyl 4-cyanobenzodithioate; Ethyl 2-(4-methoxyphenylcarbonothioylthio)acetate; 2-Phenyl-2-propyl benzodithioate; Cyanomethyl methyl(4-pyridyl) carbamodithioate; 2-Cyanopropan-2-yl N-methyl-N-(pyridin-4-yl)carbamodithioate; Methyl 2-[methyl(4-pyridinyl)carbamothioylthio]propionate; 1,1'-Bi-1H-imidazole; and functional variants thereof.

For photoinhibition to occur during the 3D printing, the amount of the photoinhibitor in the mixture may be sufficient to generate inhibiting radicals at a greater rate that initiating radicals are generated. One skilled in the art will understand how to manipulate the ratio of the amount of the photoinhibitor and/or the photoinitiator based on the intensity of the optical sources available, as well as the quantum yields and light absorption properties of the photoinhibitor and the photoinitiator in the mixture.

In some cases, the photoinitiator is present in the mixture at an amount from about 0.001 wt. % to about 5 wt. %. The photoinitiator may be present in the mixture at an amount greater than or equal to about 0.001 wt. %, 0.002 wt. %, 0.003 wt. %, 0.004 wt. %, 0.005 wt. %, 0.006 wt. %, 0.007 wt. %, 0.008 wt. %, 0.009 wt. % 0.01 wt. %, 0.02 wt. %, 0.03 wt. %, 0.04 wt. %, 0.05 wt. %, 0.1 wt. %, 0.5 wt. %, 1 wt. %, 5 wt. % or more. The photoinitiator may be present in the mixture at an amount less than or equal to about 5 wt. %, 1 wt. %, 0.5 wt. % 0.1 wt. %, 0.05 wt. %, 0.04 wt. %, 0.03 wt. %, 0.02 wt. %, 0.01 wt. %, 0.009 wt. %, 0.008 wt. % 0.007 wt. %, 0.006 wt. %, 0.005 wt. %, 0.004 wt. %, 0.003 wt. %, 0.002 wt. %, 0.001 wt. %, or less.

The photoinitiator may be selected to absorb little (e.g., less than or equal to about 10%, 5%, 4%, 3%, 2%, 1%, 0.1%, or less) or no light at the one or more wavelengths used to activate the photoinhibitor. In some cases, some overlap of the light absorption spectra of the photoinitiator and the photoinhibitor may be tolerated depending on the relative reaction rates (e.g., the figure of merit described above). Suitable photoinitiators include one or more of benzophenones, thioxanthones, anthraquinones, benzoylformate esters, hydroxyacetophenones, alkylaminoacetophenones, benzil ketals, dialkoxyacetophenones, benzoin ethers, phosphine oxides, acyloximino esters, alphahaloacetophenones, trichloromethyl-S-triazines, titanocenes, dibenzylidene ketones, ketocoumarins, dye sensitized photoinitiation systems, maleimides, and functional variants thereof. In some cases, the photoinitiator may comprise camphorquinone (CQ) and/or a functional variant thereof.

Examples of the photoinitiator in the mixture include one or more of: 1-hydroxy-cyclohexyl-phenyl-ketone (Irgacure™ 184; BASF, Hawthorne, N.J.); a 1:1 mixture of 1-hydroxy-cyclohexyl-phenyl-ketone and benzophenone (Irgacure™ 500; BASF); 2-hydroxy-2-methyl-1-phenyl-1-propanone (Darocur™ 1173; BASF); 2-hydroxy-1-[4-(2-hydroxyethoxy)phenyl]-2-methyl-1-propanone (Irgacure™ 2959; BASF); methyl benzoylformate (Darocur™ MBF; BASF); oxy-phenyl-acetic acid 2-[2-oxo-2-phenyl-acetoxy-ethoxy]-ethyl ester; oxy-phenyl-acetic 2-[2-hydroxy-ethoxy]-ethyl ester; a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester (Irgacure™ 754; BASF); alpha,alpha-dimethoxy-alpha-phenylacetophenone (Irgacure™ 651; BASF); 2-benzyl-2-(dimethylamino)-1-[4-(4-morpholinyl)-phenyl]-1-butanone (Irgacure™ 369; BASF); 2-methyl-1-[4-(methylthio)phenyl]-2-(4-morpholinyl)-1-propanone (Irgacure™ 907; BASF); a 3:7 mixture of 2-benzyl-2-(dimethylamino)-1-[4-(4-morpholinyl) phenyl]-1-butanone and alpha,alpha-dimethoxy-alpha-phenylacetophenone per weight (Irgacure™ 1300; BASF); diphenyl-(2, 4,6-trimethylbenzoyl) phosphine oxide (Darocur™ TPO; BASF); a 1:1 mixture of diphenyl-(2,4,6-trimethylbenzoyl)-phosphine oxide and 2-hydroxy-2-methyl-1-phenyl-1-propanone (Darocur™ 4265; BASF); phenyl bis(2,4,6-trimethyl benzoyl) phosphine oxide, which may be used in pure form (Irgacure™ 819; BASF, Hawthorne, N.J.) or dispersed in water (45% active, Irgacure™ 819DW; BASF); 2:8 mixture of phosphine oxide, phenyl bis(2,4,6-trimethyl benzoyl) and 2-hydroxy-2-methyl-1-phenyl-1-propanone (Irgacure™ 2022; BASF); Irgacure™ 2100, which comprises phenyl-bis(2,4,6-trimethylbenzoyl)-phosphine oxide); bis-(eta 5-2,4-cyclopentadien-1-yl)-bis-[2,6-difluoro-3-(1H-pyrrol-1-yl) phenyl]-titanium (Irgacure™ 784; BASF); (4-methylphenyl) [4-(2-methylpropyl) phenyl]-iodonium hexafluorophosphate (Irgacure™ 250; BASF); 2-(4-methylbenzyl)-2-(dimethylamino)-1-(4-morpholinophenyl)-butan-1-one (Irgacure™ 379; BASF); 4-(2-hydroxyethoxy)phenyl-(2-hydroxy-2-propyl)ketone (Irgacure™ 2959; BASF); bis-(2,6-dimethoxybenzoyl)-2,4,4-trimethylpentylphosphine oxide; a mixture of bis-(2,6-dimethoxybenzoyl)-2,4,4-trimethylpentylphosphine oxide and 2 hydroxy-2-methyl-1-phenyl-propanone (Irgacure™ 1700; BASF); 4-Isopropyl-9-thioxanthenone; and functional variants thereof.

In some cases, the mixture may comprise a stabilizer configured to inhibit formation of the polymeric material from at least a portion of the polymeric precursor. The stabilizer may be present in the mixture at an amount from about 0.0001 wt. % to about 0.5 wt. %. The stabilizer may be present in the mixture at an amount greater than or equal to about 0.0001 wt. %, 0.0002 wt. %, 0.0003 wt. %, 0.0004 wt. %, 0.0005 wt. %, 0.0006 wt. %, 0.0007 wt. %, 0.0008 wt. %, 0.0009 wt. %, 0.001 wt. %, 0.002 wt. %, 0.003 wt. %, 0.004 wt. %, 0.005 wt. %, 0.01 wt. %, 0.05 wt. %, 0.1 wt. %, 0.5 wt. %, or more. The stabilizer may be present in the mixture at an amount less than or equal to about 0.5 wt. %, 0.1 wt. %, 0.05 wt. %, 0.01 wt. %, 0.005 wt. %, 0.004 wt. %, 0.003 wt. %, 0.002 wt. %, 0.001 wt. %, 0.0009 wt. %, 0.0008 wt. %, 0.0007 wt. %, 0.0006 wt. %, 0.0005 wt. %, 0.0004 wt. %, 0.0003 wt. %, 0.0002 wt. %, 0.0001 wt. %, or less.

The presence of the stabilizer in the mixture may increase the critical energy of the light for the mixture. In some cases, the stabilizer may be a radical inhibitor. Examples of the radical inhibitor include a quinone, hydroquinoe, nitrosamine, copper-comprising compound, stable free radical (e.g., (2,2,6,6-tetramethylpiperidin-1-yl)oxidanyl), substituted phenol, mequinol, t-butyl catechol, Nitorosophenylhydroxylamine alminium salt, functional variants thereof, or mixtures thereof. In some examples, the radical inhibitor may comprise phenothiazine, copper napthalate, butylated hydroxytoluene, or functional variants thereof. The radical inhibitor may be added to the polymeric precursor (e.g., acrylate monomers) as stabilizers to prevent premature curing (e.g., polymerization, cross-linking) during handling prior to 3D printing. In some cases, in at least a portion of the mixture that is exposed to the second light (photoinhibition light), formation of the polymeric material from the polymeric precursors may not begin until most if not all of the photoinhibitors are activated and consumed (e.g., by initiating radicals) in the at least the portion of the mixture. Depending on steric, electronic, and/or mechanistic properties of the stabilizer (e.g., the radical inhibitor), the effect of the stabilizer on the critical energy of the photoinitiation light or the photoinhibition light may be different. In some cases, the addition of the stabilizer to the mixture may disproportionally increase the critical energy of the photoinhibition light for the mixture relative to the critical energy of the photoinitiation light for the mixture. In some cases, the addition of the stabilizer to the mixture may disproportionally increase the critical energy of the photoinitiation light for the mixture relative to the critical energy of the photoinhibition light for the mixture.

In some cases, the mixture may further comprise a co-initiator configured to initiate formation of the polymeric material from the polymeric precursor. In some cases, the co-initiator is present in the mixture at an amount from about 0.01 wt. % to about 10 wt. %. The co-initiator may be present in the mixture at an amount greater than or equal to about 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.2 wt. %, 0.3 wt. %, 0.4 wt. %, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, or more. The co-initiator may be present in the mixture at an amount less than or equal to about 10 wt. %, 9 wt. %, 8 wt. %, 7 wt. % 6 wt. %, 5 wt. %, 4 wt. %, 3 wt. %, 2 wt. %, 1 wt. %, 0.5 wt. %, 0.4 wt. %, 0.3 wt. %, 0.2 wt. %, 0.1 wt. %, 0.09 wt. %, 0.08 wt. %, 0.07 wt. %, 0.06 wt. %, 0.05 wt. %, 0.04 wt. %, 0.03 wt. %, 0.02 wt. %, 0.01 wt. %, or less. In other instances, the co-initiator configured to initiate formation of the polymeric material comprises one or more functional groups that act as a co-initiator. The one or more functional groups may be diluted by being attached to a larger molecule. In such cases, the co-initiator may be present in the mixture at an amount greater than or equal to about 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.2 wt. %, 0.3 wt. %, 0.4 wt. %, 0.5 wt. %, 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. % 15 wt. %, 16 wt. %, 17 wt. %, 18 wt. %, 19 wt. %, 20 wt. %, 21 wt. %, 22 wt. % 23 wt. % 24 wt. % 25 wt. % or more. The co-initiator may be present in the mixture at an amount less than or equal to about 25 wt. %, 24 wt. %, 23 wt. %, 22 wt. %, 21 wt. %, 20 wt. %, 19 wt. %, 18 wt. %, 17 wt. %, 16 wt. %, 15 wt. %, 14 wt. %, 13 wt. %, 12 wt. %, 11 wt. %, 10 wt. %, 9 wt. %, 8 wt. %, 7 wt. %, 6 wt. %, 5 wt. %, 4 wt. %, 3 wt. %, 2 wt. %, 1 wt. %, 0.5 wt. %, 0.4 wt. %, 0.3 wt. %, 0.2 wt. %, 0.1 wt. %, 0.09 wt. %, 0.08 wt. %, 0.07 wt. %, 0.06 wt. %, 0.05 wt. %, 0.04 wt. %, 0.03 wt. %, 0.02 wt. %, 0.01 wt. %, or less.

The co-initiator in the mixture may enhance the rate of formation of the polymeric material from the polymeric precursor. The co-initiator may comprise primary, secondary, and tertiary amines, alcohols, and thiols. In some cases, the co-initiator may comprise a tertiary amine. In some cases, the co-initiator may comprise ethyl-dimethyl-amino benzoate (EDMAB) or a functional variant thereof. Additional examples of the co-initiator include one or more of: isoamyl 4-(dimethylamino)benzoate, 2-ethylhexyl 4-(dimethylamino)benzoate; ethyl 4-(dimethylamino)benzoate; 3-(dimethylamino)propyl acrylate; 2-(dimethylamino)ethyl methacrylate; 4-(dimethylamino)benzophenones, 4-(diethylamino)benzophenones; 4,4'-Bis(diethylamino)benzophenones; methyl diethanolamine; triethylamine; hexane thiol; heptane thiol; octane thiol; nonane thiol; decane thiol; undecane thiol; dodecane thiol; isooctyl 3-mercaptopropionate; pentaerythritol tetrakis(3-mercaptopropionate); 4,4'-thiobisbenzenethiol; trimethylolpropane tris(3-mercaptopropionate); CN374 (Sartomer); CN371 (Sartomer), CN373 (Sartomer), Genomer 5142 (Rahn); Genomer 5161 (Rahn); Genomer (5271 (Rahn); Genomer 5275 (Rahn), TEMPIC (Bruno Boc, Germany), and functional variants thereof.

In some cases, the mixture may further comprise a light absorber configured to absorb at least the first wavelength of the first light or the second wavelength of the second light. In some cases, the light absorber is present in the mixture at an amount from about 0.001 wt. % to about 5 wt. %. The light absorber may be present in the mixture at amount greater than or equal to about 0.001 wt. %, 0.002 wt. %, 0.003 wt. %, 0.004 wt. %, 0.005 wt. %, 0.006 wt. % 0.007 wt. %, 0.008 wt. %, 0.009 wt. % 0.01 wt. %, 0.02 wt. %, 0.03 wt. %, 0.04 wt. %, 0.05 wt. % 0.1 wt. %, 0.5 wt. %, 1 wt. %, 5 wt. %, or more. The light absorber may be present in the mixture at an amount less than or equal to about 5 wt. %, 1 wt. %, 0.5 wt. % 0.1 wt. %, 0.05 wt. %, 0.04 wt. %, 0.03 wt. %, 0.02 wt. %, 0.01 wt. %, 0.009 wt. %, 0.008 wt. % 0.007 wt. %, 0.006 wt. %, 0.005 wt. %, 0.004 wt. %, 0.003 wt. %, 0.002 wt. %, 0.001 wt. %, or less.

In some cases, the light absorber may be a dye or pigment. The light absorber can be used to both attenuate light and to transfer energy (e.g., via Förster resonance energy transfer (FRET)) to photoactive species (e.g., the photoinitiator or the photoinhibitor), thereby to increase the sensitivity of the resulting mixture to a given wavelength suitable for the photoinitiation and/or the photoinhibition process. A concentration of the light absorber may be highly dependent on the light absorption properties of the light absorber, as well as the optical attenuation from other components in the mixtures. In an example, the light absorber may be configured to absorb at the second wavelength, and exposing the mixture to the second light having the second wavelength may initiate the light absorber to reduce an amount of the second light exposed to at least a portion of the mixture. One skilled in the art will understand how to utilize of one or more light absorbers at a plurality of concentrations to restrict the penetration of the photoinhibition light to a given thickness such that the photoinhibition layer is thick enough to permit separation of the newly formed layer of the 3D object from the print surface (e.g., the window). Additionally, one skilled in the art will understand how to utilize the one or more light absorbers at the plurality of concentrations to restrict penetration and/or propagation of the photoinitiating light during printing at least a portion of the 3D object. In some cases, a plurality of light absorbers may be used to independently control both photoinhibition and photoinitiation processes.

Examples of the light absorber include compounds commonly used as UV absorbers for decreasing weathering of coatings, such as: 2-hydroxyphenyl-benzophenones; 2-(2-hydroxyphenyl)-benzotriazoles (and chlorinated derivatives); and 2-hydroxyphenyl-s-triazines. Additional examples of the light absorber include those used for histological staining or dying of fabrics. Pigments such as carbon black, pthalocyanine, toluidine red, quinacridone, titanium dioxide, and functional variants thereof may also be used as light absorbers in the mixture. Dyes that may be used as light absorbers include: Martius yellow; quinolone yellow; Sudan red, Sudan I, Sudan IV, eosin, eosin Y, neutral red, acid red, Sun Chemical UVDS 150; Sun Chemical UVDS 350; Penn Color Cyan; Sun Chemical UVDJ107; 2-tert-Butyl-6-(5-chloro-2H-benzotriazol-2-yl)-4-methylphenol; 2-(2H-Benzotriazol-2-yl)-4,6-di-tert-pentylphenol; 7-diethylamino-4-methyl coumarin; 9,10-Dibutoxyanthracene; 9-phenyl acridine; and functional variants thereof.

In some cases, the polymeric precursor in the mixture may comprise monomers, one or more oligomers, or both. The monomers may be configured to polymerize to form the polymeric material. The one or more oligomers may be configured to cross-link to form the polymeric material. The monomers may be of the same or different types. An oligomer may comprise two or more monomers that are covalently linked to each other. The oligomer may be of any length, such as greater than or equal to about 2 (dimer), 3 (trimer), 4 (tetramer), 5 (pentamer), 6 (hexamer), 7, 8, 9, 10, 20, 30, 40, 50, 100, 200, 300, 400, 500, or more monomers. As an alternative, the oligomer may be of a length less than or equal to about 500, 400, 300, 200, 100, 50, 40, 30, 20, 10, 9, 8, 7, 6, 5, 4, 3, 2, or less monomers. Alternatively or in addition to, the polymeric precursor may include a dendritic precursor (monodisperse or polydisperse). The dendritic precursor may be a first generation (G1), second generation (G2), third generation (G3), fourth generation (G4), or higher with functional groups remaining on the surface of the dendritic precursor. The resulting polymeric material may comprise a monopolymer and/or a copolymer. The copolymer may be a linear copolymer or a branched copolymer. The copolymer may be an alternating copolymer, periodic copolymer, statistical copolymer, random copolymer, and/or block copolymer. In some cases, the polymeric precursor (e.g., monomer, oligomer, or both) may comprise one or more acrylates.

In some cases, the monomers is present in the mixture at an amount from about 1 wt. % to about 80 wt. %. The monomers may be present in the mixture at an amount greater than or equal to about 1 wt. %, 2 wt. %, 3 wt. %, 4 wt. %, 5 wt. %, 6 wt. %, 7 wt. % 8 wt. %, 9 wt. %, 10 wt. %, 15 wt. %, 20 wt. %, 25 wt. %, 30 wt. %, 35 wt. %, 40 wt. %, 45 wt. % 50 wt. %, 55 wt. %, 60 wt. %, 65 wt. %, 70 wt. %, 75 wt. %, 80 wt. %, or more. The monomers may be present in the mixture at an amount less than or equal to about 80 wt. %, 75 wt. %, 70 wt. %, 65 wt. %, 60 wt. %, 55 wt. %,50 wt. %, 45 wt. %, 40 wt. %, 35 wt. %, 30 wt. %, 25 wt. %, 20 wt. % 15 wt. %, 10 wt. %, 9 wt. %, 8 wt. %, 7 wt. %, 6 wt. %, 5 wt. %, 4 wt. %, 3 wt. %, 2 wt. %, 1 wt. % or less. In some cases, the mixture may not have any monomers. In such a scenario, the mixture may have one or more oligomers.

Examples of monomers include one or more of hydroxyethyl methacrylate; n-Lauryl acrylate; tetrahydrofurfuryl methacrylate; 2,2,2-trifluoroethyl methacrylate; isobornyl methacrylate; polypropylene glycol monomethacrylates, aliphatic urethane acrylate (i.e., Rahn Genomer 1122); hydroxyethyl acrylate; n-Lauryl methacrylate; tetrahydrofurfuryl acrylate; 2,2,2-trifluoroethyl acrylate; isobornyl acrylate; polypropylene glycol monoacrylates; trimethylpropane triacrylate; trimethylpropane trimethacrylate; pentaerythritol tetraacrylate; pentaerythritol tetraacrylate; triethyleneglycol diacrylate; triethylene glycol dimethacrylate; tetrathyleneglycol diacrylate; tetrathylene glycol dimethacrylate; neopentyldimethacrylate; neopentylacrylate; hexane dioldimethacylate; hexane diol diacrylate; polyethylene glycol 400 dimethacrylate; polyethylene glycol 400 diacrylate; diethylglycol diacrylate; diethylene glycol dimethacrylate; ethyleneglycol diacrylate; ethylene glycol dimethacrylate; ethoxylated bis phenol A dimethacrylate; ethoxylated bis phenol A diacrylate; bisphenol A glycidyl methacrylate; bisphenol A glycidyl acrylate; ditrimethylolpropane tetraacrylate; ditrimethylolpropane tetraacrylate; and functional variants thereof. In some cases, the monomers may comprise (i) tricyclodecanediol diacrylate, or a functional variant thereof, or (ii) phenoxy ethyl acrylate or a functional variant thereof.

In some cases, the one or more oligomers is present in the mixture at an amount from about 1 wt. % to about 30 wt. %. The one or more oligomers may be present in the mixture at an amount greater than or equal to about 1 wt. %, 2 wt. %, 3 wt. %, 4 wt. %, 5 wt. %, 6 wt. %, 7 wt. %, 8 wt. %, 9 wt. %, 10 wt. %, 15 wt. %, 20 wt. %, 25 wt. %, 30 wt. %, or more. The one or more oligomers may be present in the mixture at an amount less than or equal to about 30 wt. %, 25 wt. %, 20 wt. %, 15 wt. %, 10 wt. %, 9 wt. %, 8 wt. %, 7 wt. %, 6 wt. %, 5 wt. %, 4 wt. %, 3 wt. %, 2 wt. %, 1 wt. %, or less. In some cases, the mixture may not have the one or more oligomers. In such a scenario, the mixture may have the monomers.

In some cases, the one or more oligomers may include one or more of: polyether; polyol; epoxy; thioether; polyester; urethane; silicon; polybutadiene; phenolic based acrylates; methacrylates; and functional variants thereof. In some cases, the one or more oligomers may comprise one or more of urethane (meth)acrylate, polyester urethane (meth)acrylate, epoxy(meth)acrylate, polyether (meth)acrylate, polyol (meth)acrylate, dendritic (meth)acrylate, silicone (meth) acrylate, polybutadiene (meth)acrylate, phenolic (meth) acrylate, or a functional variant thereof. Additional examples of the one or more oligomers include Esstech Exothane 126, Esstech Exothane 108, and Sartomer CN9009.

A ratio of the monomers and the one or more oligomers in the polymeric precursor of the mixture may be based on one or more properties of the mixture (e.g., viscosity, curing rate, etc.) that is optimal for each particular 3D printing method. In an example, in the absence of inorganic particles (e.g., metal or ceramic particles) in the mixture, the ratio of the monomer and the one or more oligomers may be optimized to yield a viscosity below 3000 centipoise (cP). In some cases, the viscosity of the mixture may be below 300 cP. In some cases, the viscosity of the mixture is less than or equal to about 3000 cP, 2900 cP, 2800 cP, 2700 cP, 2600 cP, 2500 cP, 2400 cP, 2300 cP, 2200 cP, 2100 cP, 2000 cP, 1500 cP, 1000 cP, 500 cP, 100 cP, or less. As an alternative, the viscosity of the mixture may be greater than or equal to about 100 cP, 500 cP, 1000 cP, 1500 cP, 2000 cP, 2100 cP, 2200 cP, 2300 cP, 2400 cP, 2500 cP, 2600 cP, 2700 cP, 2800 cP, 2900 cP, 3000 cP, or more. In some cases, the mixture may further comprise one or more particles. The one or more particles may comprise any particulate material (a particle) that can be melted or sintered (e.g., not completely melted). The particulate material may be in powder form. The particular material may be inorganic materials. The inorganic materials may be metallic, intermetallic, ceramic materials, or any combination thereof. The one or more particles may comprise at least one metallic material, at least one intermetallic material, at least one ceramic material, or any combination thereof.

The metallic materials for the one or more particles may include one or more of aluminum, calcium, magnesium, barium, scandium, titanium, vanadium, chromium, manganese, iron, cobalt, nickel, copper, zinc, yttrium, niobium, molybdenum, ruthenium, rhodium, silver, cadmium, actinium, and gold. In some cases, the particles may comprise a rare earth element. The rare earth element may include one or more of scandium, yttrium, and elements of the lanthanide series having atomic numbers from 57-71.

An intermetallic material for the one or more particles may be a solid-state compound exhibiting metallic bonding, defined stoichiometry and ordered crystal structure (i.e., alloys). The intermetallic materials may be in prealloyed powder form. Examples of such prealloyed powders may include, but are not limited to, brass (copper and zinc), bronze (copper and tin), duralumin (aluminum, copper, manganese, and/or magnesium), gold alloys (gold and copper), rose-gold alloys (gold, copper, and zinc), nichrome (nickel and chromium), and stainless steel (iron, carbon, and additional elements including manganese, nickel, chromium, molybdenum, boron, titanium, silicon, vanadium, tungsten, cobalt, and/or niobium). In some cases, the prealloyed powders may include superalloys. The superalloys may be based on elements including iron, nickel, cobalt, chromium, tungsten, molybdenum, tantalum, niobium, titanium, and/or aluminum.

The ceramic materials for the one or more particles may comprise metal (e.g., aluminum, titanium, etc.), non-metal (e.g., oxygen, nitrogen, etc.), and/or metalloid (e.g., germanium, silicon, etc.) atoms primarily held in ionic and covalent bonds. Examples of the ceramic materials include, but are not limited to, an aluminide, boride, beryllia, carbide, chromium oxide, hydroxide, sulfide, nitride, mullite, kyanite, ferrite, titania zirconia, yttria, and magnesia.

In some cases, the mixture may comprise a pre-ceramic material. The pre-ceramic material may be a polymer that can be heated (or pyrolyzed) to form a ceramic material. The pre-ceramic material may include polyorganozirconates, polyorganoaluminates, polysiloxanes, polysilanes, polysilazanes, polycarbosilanes, polyborosilanes, etc. Additional examples of the pre-ceramic material include zirconium tetramethacrylate, zirconyl dimethacrylate, or zirconium 2-ethylhexanoate; aluminum III s-butoxide, aluminum III diisopropoxide-ethylacetoacetate; 1,3-bis(chloromethyl) 1,1,3,3-Tetrakis(trimethylsiloxy)disiloxane; 1,3-bis(3-carboxypropyl)tetramethyldisiloxane; 1,3,5,7-tetraethyl-2,4,6, 8-tetramethylcyclotetrasilazane; tris(trimethylsilyl)phosphate; tris(trimethylsiloxy)boron; and mixtures thereof.

A cross-sectional dimension of the plurality of particles may range between about 1 nanometers (nm) to about 500 micrometers (µm). The cross-sectional dimension of the plurality of particles may be greater than or equal to about 1 nm, 2 nm, 3 nm, 4 nm, 5 nm, 6 nm, 7 nm, 8 nm, 9 nm, 10 nm, 20 nm, 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, 1 µm, 2 µm, 3 µm, 4 µm, 5 µm, 6 µm, 7 µm, 8 µm, 9 µm, 10 µm, 20 µm, 30 µm, 40 µm, 50 µm, 60 µm, 70 µm, 80 µm, 90 µm, 100 µm, 200 µm, 300 µm, 400 µm, 500 µm, or more. The cross-sectional dimension of the plurality of particles may be less than or equal to about 500 µm, 400 µm, 300 µm, 200 µm, 100 µm, 90 µm, 80 µm, 70 µm, 60 µm, 50 µm, 40 µm, 30 µm, 20 µm, 10 µm, 9 µm, 8 µm, 7 µm, 6 µm, 5 µm, 4 µm, 3 µm, 2 µm, 1 µm, 900 nm, 800 nm, 700 nm, 600 nm, 500 nm, 400 nm, 300 nm, 200 nm, 100 nm, 90 nm, 80 nm, 70 nm, 60 nm, 50 nm, 40 nm, 30 nm, 20 nm, 10 nm, 9 nm, 8 nm, 7 nm, 6 nm, 5 nm, 4 nm, 3 nm, 2 nm, 1 nm, or less.

The one or more particles may be present in the mixture in an amount from about 10 wt. % to about 97 wt. %. The one or more particles may be present in the mixture in an amount greater than or equal to about 10 wt. %, 11 wt. %, 12 wt. %, 13 wt. %, 14 wt. %, 15 wt. %, 16 wt. %, 17 wt. %, 18 wt. %, 19 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 90 wt. %, 95 wt. %, 96 wt. %, 97 wt. %, or more. The one or more particles may be present in the mixture in an amount less than or equal to about 97 wt. %, 96 wt. % 95 wt. % 90 wt. % 85 wt. % 80 wt. % 75 wt. % 70 wt. % 65 wt. % 60 wt. %, 55 wt. %, 50 wt. %, 45 wt. %, 40 wt. % 35 wt. % 30 wt. % 25 wt. % 20 wt. % 19 wt. %, 18 wt. %, 17 wt. %, 16 wt. %, 15 wt. %, 14 wt. %, 13 wt. %, 12 wt. %, 11 wt. %, 10 wt. %, or less.

When the mixture comprises the one or more particles, the mixture may have a viscosity ranging from about 4,000 cP to about 2,000,000 cP. When the mixture comprises the one or more particles, the mixture may have a viscosity greater than or equal to about 4,000 cP, 10,000 cP, 20,000 cP, 30,000 cP, 40,000 cP, 50,000 cP, 60,000 cP, 70,000 cP, 80,000 cP, 90,000 cP, 100,000 cP, 200,000 cP, 300,000 cP, 400,000 cP, 500,000 cP, 600,000 cP, 700,000 cP, 800,000 cP, 900,000 cP, 1,000,000 cP, 2,000,000 cP, or more. When the mixture comprises the one or more particles, the mixture may have a viscosity less than or equal to about 2,000,000 cP, 1,000, 000 cP, 900,000 cP, 800,000 cP, 700,000 cP, 600,000 cP, 500,000 cP, 400,000 cP, 300,000 cP, 200,000 cP, 100,000 cP, 90,000 cP, 80,000 cP, 70,000 cP, 60,000 cP, 50,000 cP, 40,000 cP, 30,000 cP, 20,000 cP, 10,000 cP, 4,000 cP, or less.

During printing the 3D object, the first wavelength of the first light and the second wavelength of the second light may be different wavelengths. The first light and the second light may be directed by the same light source. As an alternative, the first light may be directed by a first light source and the second light may be directed by a second light source. In some cases, the first light may comprise wavelengths ranging between about 420 nanometers (nm) to about 510 nm. In some cases, the second light may comprise wavelengths ranging between about 350 nm to about 410 nm. In an example, the first wavelength to induce photoinitiation may be about 460 nm. In an example, the second wavelength to induce photoinhibition may be about 365 nm.

In some cases, the method may further comprise, prior to printing the 3D object, receiving or generating a computer model of the 3D object. At least a portion of the 3D object may be in accordance to the computer model of the 3D object. In some cases, the method may further comprise repeating the steps (a) and (b) one or more times.

In some cases, the method may further comprise providing a build head adjacent to the build surface. The at least the portion of the 3D object may be formed adjacent to the build head. During formation or printing of the at least the portion of the 3D object, the build head may be moved along a direction away from the build surface. The build head may be operatively coupled to a controller. The controller may be configured or programmed to direct the build head to move along a direction away from the build surface during printing the 3D object. Such movement may be relative movement, and thus the moving piece may be (i) the build head, (ii) the build surface, or (iii) both.

In some cases, the method may comprise using a vat. The build surface may be part of a vat configured to contain the mixture. The vat may comprise an inlet and/or an outlet. The inlet may be in fluid communication with a source of the mixture. The outlet may be in fluid communication with a container configured to collect any excess mixture from the vat. The vat may be operatively coupled to the controller. During printing the 3D object, the controller may be configured or programmed to direct flow of the mixture (i) from the source towards the vat through the inlet and/or (ii) from the vat towards the container, thereby to adjust an amount of the mixture in the vat. In some examples, the vat may comprise a plurality of inlets that are in fluid communication a plurality of sources. Each of the plurality of sources may comprise the polymeric precursor, the photoinitiator, the photoinhibitor, and/or additional components that can be added to the mixture (e.g., co-initiators, dyes, inorganic particles, etc.). During printing the 3D object, the controller may be configured or programmed to direct flow from each of the plurality of sources towards the vat to adjust an amount of the polymeric precursor, the photoinitiator, the photoinhibitor, and/or the additional components in the mixture contained in the vat.

In an example, the bottom of the vat may comprise a window, and the window may be the build surface. During printing a layer of the 3D object, the build head may be moved along a direction away from the window. Within a portion of the mixture defined between the window and the build head, the location adjacent to the window may be a photoinhibition layer. The location disposed away from the window and adjacent to the build head or a previously deposited layer of the 3D object adjacent to the build head may be a photoinitiation layer. In such case, the photoinitiation light or the photoinhibition light may be directed from the bottom of the vat, through the window and into the mixture held inside the vat. Alternatively or in addition to, one or more sides of the vat may comprise a window, and the photoinitiation light or the photoinhibition light may be directed from the one or more sides of the vat and into the mixture. In such a scenario, the photoinhibition layer may prevent adhesion of the polymeric material adjacent to any of the sides of the vat.

In another example, the open surface of the mixture not in contact with any of the surfaces of the vat may be the build surface. During printing a layer of the 3D object, the build head may be moved along a direction away from the open surface of the mixture. Within a portion of the mixture defined between the open surface of the mixture and the build head, the location adjacent to the open surface of the mixture may be a photoinhibition layer. The location disposed away from the open surface of the mixture and adjacent to the build head or a previously deposited layer of the 3D object adjacent to the build head may be a photoinitiation layer. In such case, the photoinitiation light and the photoinhibition light may be directed from above open surface of the mixture. In such a scenario, the photoinhibition layer may prevent the portion of the mixture adjacent to the open surface of the mixture from being used to form the polymeric material during 3D printing. In an example, the portion of the mixture adjacent to the open surface may be used as a protective layer for the mixture during 3D printing.

In some cases, the method may comprise using an open platform. The open platform may be used instead of the vat. The build surface may be part of the open platform. The method may further comprise providing the mixture or a film of the mixture adjacent to the open platform prior to printing each layer of the 3D object. The open platform may be configured to hold a film the mixture. The open platform may comprise a window. The open platform may comprise at least one deposition head comprising a nozzle in fluid communication with a source of the mixture. The open platform may comprise an optical source that provides light (e.g., the photoinitiation light and/or the photoinhibition light) through the window for initiating formation of the polymeric material in at least a portion of the film of the mixture. The open platform may be operatively coupled to a controller. The controller may be programmed to (i) direct the deposition head to move across the open platform and dispense the mixture through the nozzle to deposit the film over the window, and (ii) direct the optical source to provide the light to initiate formation of the polymeric material in at least the portion of the film of the mixture, thereby printing at least a portion of the 3D object. The at least one deposition head of the open platform may comprise a wiper that is configured to (i) reduce or inhibit flow of the mixture out of the deposition head, (ii) flatten the film of the mixture, and/or (iii) remove any excess of the mixture. The wiper may be a blade (e.g., a doctor blade), a roller, or a rod (e.g., a wire wound rod).

In some cases, the open platform may comprise a cleaning zone configured to clean the deposition head. The cleaning zone may comprise a wiper, a nozzle configured to provide a cleaning solvent, or both. In some cases, the open platform may comprise a container configured to collect any excess mixture during or after the 3D printing. In some cases, the open platform may comprise a transparent film adjacent to the build surface comprising the window. The transparent film may be configured to hold the film of the mixture. The transparent film may comprise one or more fluoropolymers (e.g., polyvinylidene fluoride (PVDF), ethylenetetrafluoroethylene (ETFE), etc.) that reduce adhesion of the cured portion of the mixture on the transparent film.

Prior to printing a layer of the 3D object, the build head may come in contact with the film of the mixture adjacent to the open platform. Within a portion of the film of the mixture defined between the window and the build head, the location adjacent to the window may be a photoinhibition layer. The location disposed away from the window and adjacent to the build head or a surface of a previously deposited layer of the 3D object adjacent to the build head may be a photoinitiation layer.

FIG. 1 shows an example working curve plot for a mixture. Different positions of a layer of the mixture may be exposed to different doses of either the photoinitiation light ("Vis") or the photoinhibition light ("UV"). The thickness of the newly formed polymeric material at each of the different positions may be measured and plotted against their respective doses of light. As shown in dotted plot 110, doses of the photoinitiation light less than 100 millijoule per square centimeter (mJ/cm$^2$) may be sufficient to initiate formation of the polymeric material in the mixture. On the other hand, as shown in dotted plot 120, doses of the photoinhibition light greater than 100 mJ/cm$^2$ may in some instances be insufficient to initiate formation of the polymeric material in the mixture. The dotted plots 110 and 120 can be fitted to the working curve equation (see Equation 2) to generate the calculated working curves 112 and 122, respectively. The x-intercepts 114 and 124 of the calculated working curves may represent the critical energy of the photoinitiation light and the photoinitiation light, respectively, that may be sufficient to initiate formation of the polymeric material in the mixture. In this example, the critical energy 124 of the photoinhibition light ($E_{C,\lambda_2}$) is greater than the critical energy 114 of the photoinitiation light ($E_{C,\lambda_1}$), and the resulting figure of merit (Equation 1) is therefore greater than 1.

Figure 2:
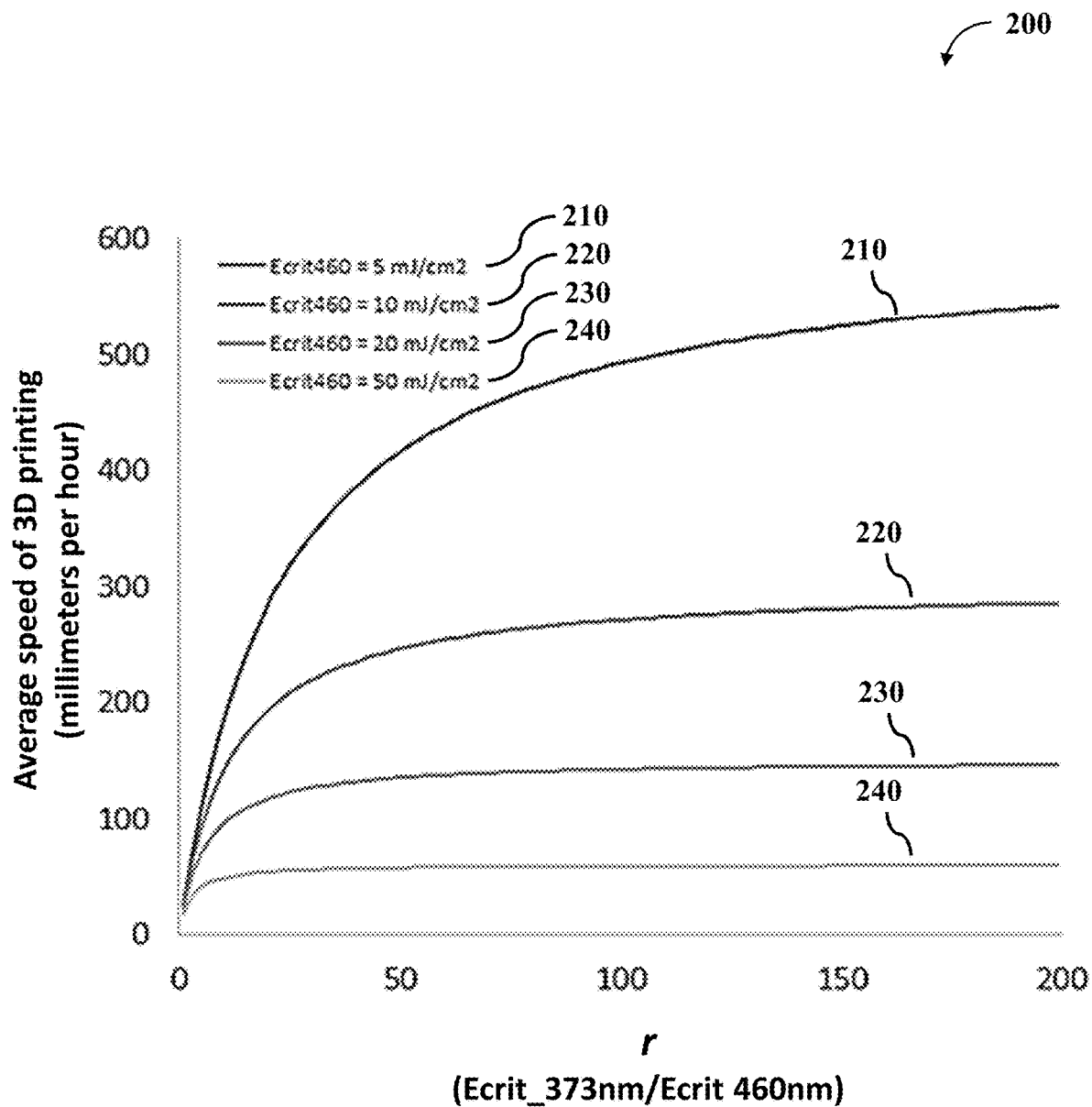
FIG. 2 shows a model graph of the average speed of 3D printing.

FIG. 2 shows a model graph of the average speed ($v_{avg}$) of 3D printing as a function of the ratio r. The ratio r may be the ratio of the critical energies of the photoinhibition light (e.g., a wavelength at 365 nm) and the photoinitiation light (e.g., a wavelength of 460 nm), as shown in Equation 2. A representative set of 3D printing parameters ($I_{460}$=40 mJ/cm$^2$; $I_{373}$=10 mJ/cm$^2$; $d_p$=220 μm; $\delta$=60 μm; $t_{sep}$=2.8 sec; $f_1$=8; and $f_2$=0.25) along with a model set of varied critical energies of the photoinitiation wavelength 210, 220, 230, 240, and 250 may be used to solve for the average speed of 3D printing in Equation 9. As shown in FIG. 2, for the fastest curing system 210 (i.e., the system with the lowest critical energy of the photoinitiation light), achieving a high value of r may be critical to increasing the average speed of 3D printing.

Tables 1 and 2 show effects of different stabilizers (e.g., radical inhibitors) on the value of the ratio r (Equation 3) of a mixture. Table 1 lists the components and their amounts in a base mixture without a stabilizer. Table 2 lists different types and concentrations of the stabilizers added to the base mixture, as well as the effective critical energy of the photoinitiation light ($E_{C,460\ nm}$), the effective critical energy of the photoinhibition light ($E_{C,373\ nm}$), and the value of the ratio r. In this example, the addition of t-butyl catechol or butylated hydroxy toluene to the base mixture results in the highest increase in the value of the ratio r.

TABLE 1

| Component | (wt. %) |
| --- | --- |
| Exothane 126 | 19.3 |
| Tricyclodecanediol diacrylate | 57.8 |
| Phenoxy ethyl acrylate | 19.3 |
| Camphorquinone | 0.96 |
| Ethyl dimethyl amino benzoate | 0.58 |
| 2, 2'4-tris(2-chlorophenyl)-5-(3, 4-dimethoxyphenyl)-4', 5'-diphenyl-1, 1'-biimidazole | 0.96 |
| Sun Chemical UVDS 150 | 0.12 |
| Tinuvin 326 | 0.96 |

TABLE 2

| | Stabilizer w/w (%) | $E_{C,\lambda_1}$ (mJ/cm$^2$) | $E_{C,\lambda_2}$ (mJ/cm$^2$) | r |
| --- | --- | --- | --- | --- |
| Base mixture without a stabilizer | 0 | 23.1 | 577 | 25 |
| t-butyl catchol | 0.00019 | 25.9 | 900 | 35 |
| phenothiazine | 0.00025 | 50.34 | 824 | 16 |
| (2,2,6,6-Tetramethylpiperidin-1-yl)oxyl | 0.00031 | 232 | 3000 | 13 |
| 1-Phenyl-3-pyrazolidinone | 0.00021 | 35.6 | 774 | 22 |
| Mequinol | 0.00014 | 26.1 | 655 | 25 |
| Hydroquinone | 0.00013 | 27.1 | 818 | 30 |
| Copper napthalate | 0.00047 | 36.54 | 858 | 23 |
| tetrabenzyl dithiocarbamate | 0.00156 | 122 | 900 | 7 |
| Butylated hydroxy toluene | 0.00050 | 21.8 | 1400 | 64 |

Mixtures and Compositions for 3D Printing

Another aspect of the present disclosure provides mixtures for printing a 3D object. A mixture for printing a 3D object may comprise a polymeric precursor, a photoinitiator configured to initiate formation of a polymeric material from the polymeric precursor upon exposure to a first light having a first wavelength, and a photoinhibitor configured to inhibit formation of the polymeric material from the polymeric precursor upon exposure to a second light having a second wavelength. During printing of the at least the portion of the 3D object, a ratio of (i) an energy of the second light sufficient to initiate formation of the polymeric material relative to (ii) an energy of the first light sufficient to initiate formation of the polymeric material may be greater than 1. The mixture may include other components of mixtures described herein, such as described above in the context of methods for 3D printing.

In some cases, the ratio of (i) the energy of the second light sufficient to initiate formation of the polymeric material relative to (ii) the energy of the first light sufficient to initiate formation of the polymeric material is greater than at least about 1, 2, 3, 4, 5, 6, 7, 8, 9, 10, 11, 12, 13, 14, 15, 16, 17, 18, 19, 20, 25, 30, 40, 50, 100, or more. In an example, the ratio is greater than 5. In another example, the ratio is greater than 10. In another example, the ratio is greater than 20. As an alternative, the ratio may be less than or equal to about 100, 50, 40, 30, 25, 20, 19, 18, 17, 16, 15, 14, 13, 12, 11, 10, 9, 8, 7, 6, 5, 4, 3, or 2.

Table 3 shows mixtures comprising different components that may be usable for 3D printing.

TABLE 3

| Category | Component | | | | | | | | | | | |
|---|---|---|---|---|---|---|---|---|---|---|---|---|
| Oligomer (wt. %) | Esstech Exothane 106 | 0 | 19 | 19 | 19 | 19 | 19 | 19 | 19 | 0 | 0 | 0 |
| Monomer (wt. %) | SR494 | 30 | 0 | 0 | 0 | 0 | 0 | 0 | 0 | 33 | 33 | 9 |
| | SR368 | 41 | 0 | 0 | 0 | 0 | 0 | 0 | 0 | 38 | 38 | 0 |
| | SR833s | 0 | 56 | 57 | 56 | 56 | 58 | 58 | 58 | 0 | 0 | 0 |
| | PEA | 24 | 19 | 20 | 21 | 21 | 19 | 19 | 19 | 24 | 24 | 48 |
| Additives (wt. %) | Byk Ceraflour 1000 | 0 | 0 | 0 | 0 | 1 | 0 | 0 | 0 | 0 | 0 | 0 |
| | Sucrose Benzoate | 0 | 0 | 0 | 0 | 0 | 0 | 0 | 0 | 0 | 0 | 31 |
| | Byk Ceraflour 929 | 0 | 0 | 0 | 0 | 0 | 0 | 0 | 0 | 0 | 0 | 9 |
| Photoinitiator (wt. %) | camphorquinone | 0.99 | 2.00 | 1.00 | 1.00 | 0.99 | 0.96 | 0.96 | 0.96 | 1.89 | 1.90 | 0.99 |
| Co-initiator (wt. %) | ethyldimethylamino benzoate | 0.60 | 1.20 | 0.60 | 0.60 | 0.60 | 0.58 | 0.58 | 0.58 | 1.26 | 1.19 | 0.60 |
| Photoinhibitor (wt. %) | Tronly HABI - 102 | 2.00 | 2.00 | 1.27 | 1.50 | 1.49 | 0.96 | 0.96 | 0.96 | 1.07 | 1.07 | 0.99 |
| Light absorber (wt. %) | Sunchemical UVDS150 | 0.11 | 0.11 | 0.17 | 0.16 | 0.16 | 0.12 | 0.12 | 0.12 | 0.13 | 0.11 | 0.10 |
| | Blue-Penn Color | 0.00 | 0.00 | 0.00 | 0.00 | 0.03 | 0.00 | 0.00 | 0.00 | 0.03 | 0.10 | 0.00 |
| | Tinuvin 326 | 0.99 | 1.00 | 1.00 | 1.00 | 0.99 | 0.96 | 0.97 | 0.96 | 0.95 | 0.48 | 0.44 |
| Stabilizer (wt. %) | butylated hydroxy toluene | 0.00 | 0.00 | 0.00 | 0.00 | 0.00 | 0.22 | 0.05 | 0.10 | 0.02 | 0.03 | 0.03 |
| $E_{C\lambda_1}$ (mJ/cm²) | | 14 | 13 | 31 | 42 | 26 | 42 | 34 | 36 | 6 | 7 | 23 |
| $d_P$ (micrometers) | | 281 | 261 | 248 | 245 | 253 | 210 | 224 | 204 | 218 | 247 | 149 |
| $E_{C\lambda_2}$ (mJ/cm²) | | 244 | 195 | 600 | 490 | 574 | 15000 | 1200 | 4200 | 329 | 252 | 584 |
| $r(E_{C\lambda_2}/E_{C\lambda_1})$ | | 18 | 15 | 19 | 12 | 22 | 354 | 36 | 116 | 54 | 36 | 25 |

Systems for 3D Printing

Another aspect of the present disclosure provides systems for printing a 3D object. A system for printing a 3D object may comprise a build surface configured to support a mixture comprising (i) a polymeric precursor, (ii) a photoinitiator configured to initiate formation of a polymeric material from the polymeric precursor, and (iii) a photoinhibitor configured to inhibit formation of the polymeric material from the polymeric precursor. The system may also include one or more optical sources and a controller operatively coupled to the one or more optical sources. The controller may be configured to direct the one or more optical sources to expose the mixture to (i) a first light having a first wavelength sufficient to cause the photoinitiator to initiate formation of the polymeric material from the polymeric precursor at a location disposed away from the build surface, to print at least a portion of the 3D object, and (ii) a second light having a second wavelength sufficient to cause the photoinhibitor to inhibit formation of the polymeric material from the polymeric precursor at a location adjacent to the build surface. During printing of the at least the portion of the 3D object, a ratio of (i) an energy of the second light sufficient to initiate formation of the polymeric material relative to (ii) an energy of the first light sufficient to initiate formation of the polymeric material may be greater than 1. The systems disclosed herein may utilize all components and configurations described in methods for printing a 3D object of the present disclosure.

The ratio of (i) the energy of the second light sufficient to initiate formation of the polymeric material relative to (ii) the energy of the first light sufficient to initiate formation of the polymeric material may be greater than at least about 1, 2, 3, 4, 5, 6, 7, 8, 9, 10, 11, 12, 13, 14, 15, 16, 17, 18, 19, 20, 25, 30, 40, 50, 100, or more. In an example, the ratio is greater than 5. In another example, the ratio is greater than 10. In another example, the ratio is greater than 20. As an alternative, the ratio may be less than or equal to about 100, 50, 40, 30, 25, 20, 19, 18, 17, 16, 15, 14, 13, 12, 11, 10, 9, 8, 7, 6, 5, 4, 3, or 2.

In some cases, the controller may be operatively coupled to a computer system and the system for printing the 3D object. The controller may be configured or programmed to receive or generate a computer model of the 3D object. The at least the portion of the 3D object may be in accordance to the computer model of the 3D object.

In some cases, the controller may be operatively coupled to the build head. The controller may be configured or programmed to direct movement of the build head along a direction away from the build surface during printing the at least the portion of the 3D object. Alternatively or in addition to, the controller may be operatively coupled to the vat or the open platform. The controller may be configured or programmed to direct movement of the vat or the open platform relative to the build head during printing the at least the portion of the 3D object. In some cases, the controller may direct movement of both (i) the build head and (ii) the vat or the open plat form, thereby to direct their relative movement during printing the 3D object.

The controller may be operatively coupled to other components and their configurations described in the aforementioned method for printing a 3D object.

Figure 3:
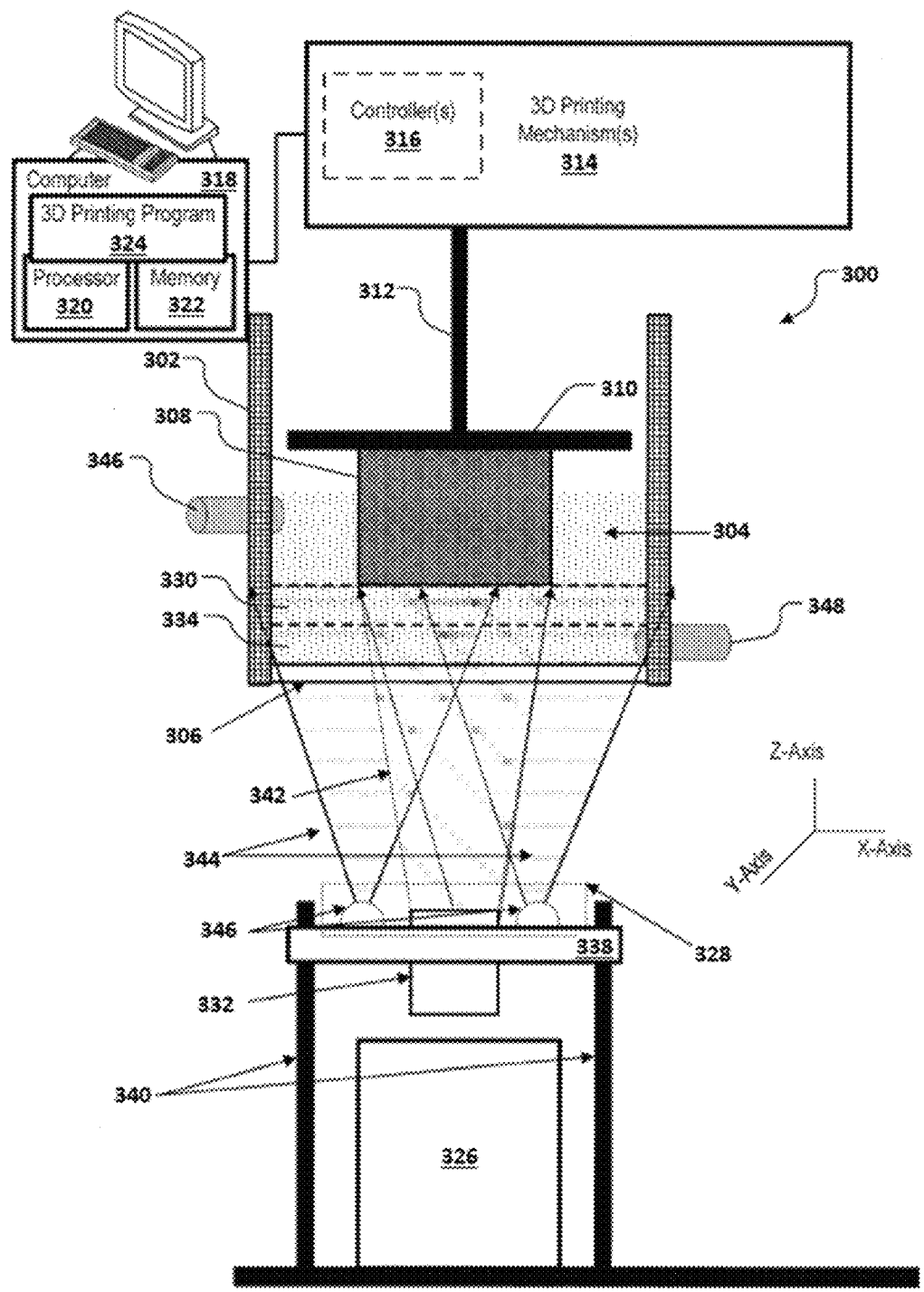
FIG. 3 shows an example of a 3D printing system.

FIG. 3 shows an example of a 3D printing system 300. The system 300 includes a vat 302 to hold a mixture 304, which includes a polymeric precursor. The vat 302 includes a window 306 in its bottom through which illumination is transmitted to cure a 3D printed structure 308. The 3D printed structure 308 is shown in FIG. 3 as a block, however, in practice a wide variety of complicated shapes can be 3D printed. In some cases, the 3D printed structure 308 includes entirely solid structures, hollow core prints, lattice core prints and generative design geometries. Additionally, a 3D printed structure 308 can be partially cured such that the 3D printed structure 308 has a gel-like or viscous mixture characteristic.

The 3D printed structure 308 is 3D printed on a build head 310, which is connected by a rod 312 to one or more 3D printing mechanisms 314. The 3D printing mechanisms 314 can include various mechanical structures for moving the build head 310 within and above the vat 302. This movement is a relative movement, and thus moving pieces can be the build head 310, the vat 302, or both, in various cases. In some cases, the 3D printing mechanisms 314 include Cartesian (xyz) type 3D printer motion systems or delta type 3D printer motion systems. In some cases, the 3D printing mechanisms 314 include one or more controllers 316 which can be implemented using integrated circuit technology, such as an integrated circuit board with embedded processors and firmware. Such controllers 316 can be in communication with a computer or computer systems 318. In some cases, the 3D printing system 100 includes a computer 318 that connects to the 3D printing mechanisms 314 and operates as a controller for the 3D printing system 100.

A computer 318 can include one or more hardware (or computer) processors 320 and a memory 322. For example, a 3D printing program 324 can be stored in the memory 322 and run on the one or more processors 320 to implement the techniques described herein. The controller 318, including the one or more hardware processors 320, may be individually or collectively programmed to implement methods of the present disclosure.

Multiple devices emitting various wavelengths and/or intensities of light, including a light projection device 326 and light sources 328, can be positioned below the window 306 and in communication to the computer 318 (or other controller). In some cases, the multiple devices include the light projection device 326 and the light sources 328. The light sources 328 can include greater than or equal to about 2, 3, 4, 5, 6, 7, 8, 9, 10, or more light sources. As an alternative, the light sources 328 may include less than or equal to about 10, 9, 8 7, 6, 5, 4, 3, 2 or less light sources. As an alternative to the light sources 328, a single light source may be used. The light projection device 326 directs a first light having a first wavelength into the mixture 304 within the vat 302 through window 306. The first wavelength emitted by the light projection device 326 is selected to produce photoinitiation and is used to create the 3D printed structure 308 on the build head 310 by curing the photoactive resin in the mixture 304 within a photoinitiation layer 330. In some cases, the light projection device 326 is utilized in combination with one or more projection optics 332 (e.g. a projection lens for a digital light processing (DLP) device), such that the light output from the light projection device 326 passes through one or more projection optics 332 prior to illuminating the mixture 304 within the vat 302.

In some cases, the light projection device 326 is a DLP device including a digital micro-mirror device (DMD) for producing patterned light that can selectively illuminate and cure 3D printed structures 308. The light projection device 326, in communication with the computer 318, can receive instructions from the 3D printing program 324 defining a pattern of illumination to be projected from the light projection device 326 into the photoinitiation layer 330 to cure a layer of the photoactive resin onto the 3D printed structure 308.

In some cases, the light projection device 326 and projection optics 332 are a laser and a scanning mirror system, respectively (e.g., stereolithography apparatus). Additionally, in some cases, the light source includes a second laser and a second scanning mirror system. Such light source may emit a beam of a second light having a second wavelength. The second wavelength may be different from the first wavelength. This may permit photoinhibition to be separately controlled from photoinitiation. Additionally, in some cases, the platform 338 is separately supported on adjustable axis rails 340 from the projection optics 332 such that the platform 338 and the projection optics 332 can be moved independently.

The relative position (e.g., vertical position) of the platform 338 and the vat 302 may be adjusted. In some examples, the platform 338 is moved and the vat 302 is kept stationary. As an alternative, the platform 338 is kept stationary and the vat 302 is moved. As another alternative, both the platform 338 and the vat 302 are moved.

The light sources 328 direct a second light having a second wavelength into the mixture 304 in the vat 302. The second light may be provided as multiple beams from the light sources 328 into the build area simultaneously. As an alternative, the second light may be generated from the light sources 328 and provided as a single beam (e.g., uniform beam) into the beam area. The second wavelength emitted by the light sources 328 is selected to produce photoinhibition in the photoactive resin in the mixture 304 and is used to create a photoinhibition layer 334 within the mixture 304 directly adjacent to the window 306. The light sources 328 can produce a floodlight to create the photoinhibition layer 334, the flood light being a non-patterned, high-intensity light. In some cases, the light sources 328 are light emitting diodes (LEDs) 336. The light sources 328 can be arranged on a platform 338. The platform 338 is mounted on adjustable axis rails 340. The adjustable axis rails 340 allow for movement of the platform 338 along an axis. Further details about the arrangement of the light sources 328 on the platform 338 and the positioning of the platform in the 3D printing system 100 will be described in more detail with reference to FIGS. 3A-3C. In some cases, the platform 338 additionally acts as a heat-sink for at least the light sources 328 arranged on the platform 338.

For each of the light projection device 326 and the light sources 328, there is a beam path for light emitted from the respective light source under normal operating conditions (e.g., device is "on"). For example, a depiction of a beam path for light projection device 326 is shown in FIG. 1 as a projection beam path 342. Beam paths 344 are a depiction of exemplary beam paths for two LEDs 336. Although beam paths 342 and 344 are depicted in FIG. 1 as two-dimensional, a beam path can be three-dimensional with a cross-section that can be circular, elliptical, rectangular, or the like. In some cases, the photoinitiation wavelength is approximately 460 nm, and the photoinhibition wavelength is approximately 365 nm.

The respective thicknesses of the photoinitiation layer 330 and the photoinhibition layer 334 can be adjusted by computer 318 (or other controller). In some cases, this change in layer thickness(es) is performed for each new 3D printed layer, depending on the desired thickness of the 3D printed layer, and/or the type of 3D printing process being performed. The thickness(es) of the photoinitiation layer 330 and the photoinhibition layer 334 can be changed, for example, by changing the intensity of the respective light emitting devices, exposure times for the respective light emitting devices, the photoactive species in the mixture 304, or a combination thereof. In some cases, by controlling relative rates of reactions between the photoactive species (e.g., by changing relative or absolute amounts of photoactive species in the mixture, or by adjusting light intensities of the first and/or second wavelength), the overall rate of polymerization can be controlled. This process can thus be used to prevent polymerization from occurring at the resin-window interface and control the rate at which polymerization takes place in the direction normal to the resin-window interface.

For example, in some cases, an intensity of the light sources 328 emitting a photoinhibiting wavelength to create a photoinhibition layer 334 is altered in order to change a thickness of the photoinhibition layer 334. Altering the intensity of the light sources 328 can include increasing the intensity or decreasing the intensity of the light sources 328. Increasing the intensity of the light sources 328 (e.g., LEDs) can be achieved by increasing a power input to the light sources 328 by controllers 316 and/or computer 318. Decreasing the intensity of the light sources 328 (e.g., LEDs) can be achieved by decreasing a power input to the light sources 328 by controllers 316 and/or computer 318. In some cases, increasing the intensity of the light sources 328, and thereby increasing the thickness of the photoinhibition layer 334, will result in a decrease in thickness of the photoinitiation layer 330. A decreased photoinitiation layer thickness can result in a thinner 3D printed layer on the 3D printed structure 308.

In some cases, the intensities of all of the light sources 328 are altered equally (e.g., decreased by a same level by reducing power input to all the light sources by an equal amount). The intensities of the light sources 328 can also be altered where each light source of a set of light sources 328 produces a different intensity. For example, for a set of four LEDs generating a photoinhibition layer 334, two of the four LEDs can be decreased in intensity by 10% (by reducing power input to the LEDs) while the other two of the four LEDs can be increased in intensity by 10% (by increasing power input to the LEDs). Setting different intensities for a set of light sources 328 can produce a gradient of thickness in a cured layer of the 3D printed structure or other desirable effects.

In some cases, the computer 318 (in combination with controllers 316) adjusts an amount of a photoinitiator species and/or a photoinhibitor species in the mixture 304. The photoinitiator and photoinhibitor species can be delivered to the vat 302 via an inlet 346 and evacuated from the vat 302 via an outlet 348. In general, one aspect of the photoinhibitor species is to prevent curing (e.g., suppress cross-linking of the polymers) of the photoactive resin in the mixture 304. In general, one aspect of the photoinitiation species is to promote curing (e.g., enhance cross-linking of the polymers) of the photoactive resin in the mixture 304. In some cases, the 3D printing system 100 includes multiple containment units to hold input/output flow from the vat 302.

In some cases, the intensities of the light sources 328 are altered based in part on an amount (e.g., volumetric or weight fraction) of the one or more photoinhibitor species in the mixture and/or an amount (e.g., volumetric or weight fraction) of the one or more photoinitiator species in the mixture. Additionally, the intensities of the light sources 328 are altered based in part on a type (e.g., a particular reactive chemistry, brand, composition) of the one or more photoinhibitor species in the mixture and/or a type (e.g., a particular reactive chemistry, brand, composition) of the one or more photoinitiator species in the mixture. For example, an intensity of the light sources 328 for a mixture 304 including a first photoinhibitor species of a high sensitivity (e.g., a high reactivity or conversion ratio to a wavelength of the light sources 328) can be reduced when compared to the intensity of the light sources 328 for a mixture 304 including a second photoinhibitor species of a low sensitivity (e.g., a low reactivity or conversion ratio to a wavelength of the light sources 328).

In some cases, the changes to layer thickness(es) is performed during the creation of the 3D printed structure 308 based on one or more details of the 3D printed structure 308 at one or more points in the 3D printing process. For example, the respective layer thickness(es) can be adjusted to improve resolution of the 3D printed structure 308 in the dimension that is the direction of the movement of the build head 310 relative to the vat 302 (e.g., z-axis) in the layers that require it.

Though the 3D printing system 300 is described in FIG. 3 as a bottom-up system where the light projection device 326 and the light sources 328 are located below the vat 302 and build head 310, other configurations can be utilized. For example, a top-down system, where the light projection device 326 and the light sources 328 are located above the vat 302 and build head 310, can also be employed.

Other features of the printing system 300 of FIG. 3 may be as described in, for example, U.S. Patent Publication No. 2016/0067921 ("THREE DIMENSIONAL PRINTING ADHESION REDUCTION USING PHOTOINHIBITION"), which is entirely incorporated herein by reference.

Figure 4:
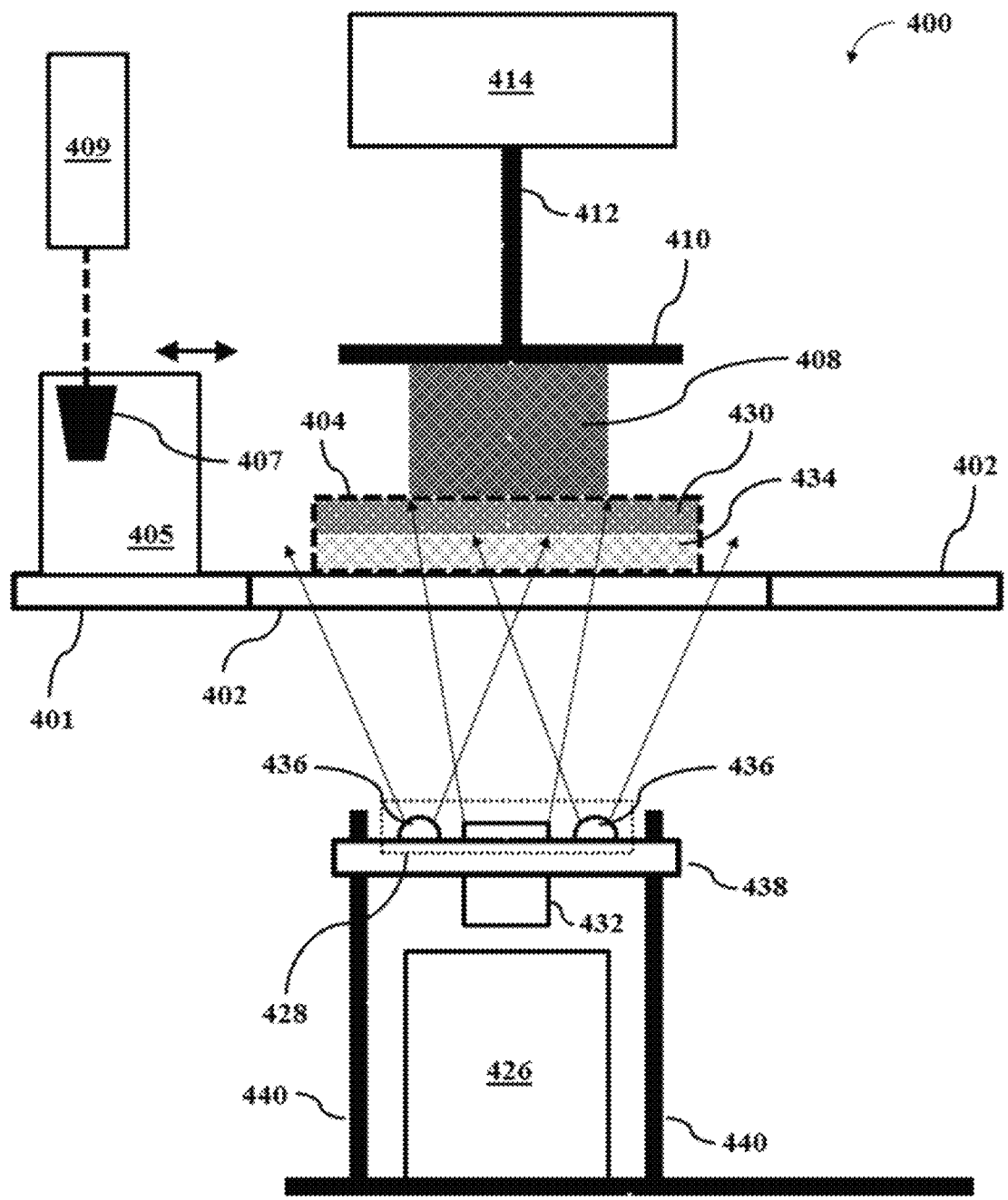
FIG. 4 shows an example of another 3D printing system.

FIG. 4 shows an example of another 3D printing system 400. The system 400 includes an open platform 401 comprising a print window 402 to hold a film of a mixture (e.g., a viscous liquid) 404, which includes a photoactive resin. The mixture 404 may also include a plurality of particles (e.g., metal, intermetallic, and/or ceramic particles). The system 400 includes a deposition head 405 that comprises a nozzle 407 that is in fluid communication with a source of the mixture 409. The source of the mixture 409 may be a syringe. The syringe may be operatively coupled to a syringe pump. The syringe pump can direct the syringe in a positive direction (from the source of the mixture 409 towards the nozzle 407) to dispense the mixture. The syringe pump can direct the syringe in a negative direction (away from the nozzle 407 towards the source of the mixture 409) to retract any excess mixture in the nozzle and/or on the print window back into the syringe. The deposition head 405 is configured to move across the open platform 401 comprising the print window 402 to deposit the film of the mixture 404. In some cases, the system 400 may comprise an additional source of an additional mixture that is in fluid communication with the nozzle 407 or an additional nozzle of the deposition head 405. In some cases, the system 400 may comprise an additional deposition head comprising an additional nozzle that is in fluid communication with an additional source of an additional mixture. In some cases, the system 400 may comprise three or more deposition heads and three or more sources of the same or different mixtures.

Illumination may be transmitted through the print window 402 to cure at least a portion of the film of the mixture 404 to print at least a portion of a 3D structure 408. The at least the portion of the 3D structure 408 is shown as a block, however, in practice a wide variety of complicated shapes may be printed. In some cases, the at least the portion of the 3D structure 408 includes entirely solid structures, hollow core prints, lattice core prints, and generative design geometries.

The at least the portion of the 3D structure 408 may be printed on a build head 410, which may be connected by a rod 412 to one or more 3D printing mechanisms 414. The 3D printing mechanisms 414 may include various mechanical structures for moving the build head 410 in a direction towards and/or away from the open platform 401. This movement is a relative movement, and thus moving pieces can be the build head 410, the open platform 401, or both, in various embodiments. In some cases, the 3D printing mechanisms 414 include Cartesian (xyz) type 3D printer motion systems or delta type 3D printer motion systems. In some cases, the 3D printing mechanisms 414 include one or more controllers to direct movement of the build head 410, the open platform 401, or both.

Multiple devices emitting various wavelengths and/or intensities of light, including a light projection device 426 and light sources 428, may be positioned below the print window 402 and in communication with the one or more controllers. In some cases, the light sources 428 include greater than or equal to about 2, 3, 4, 5, 6, 7, 8, 9, 10, or more light sources. As an alternative, the light sources 428 can include less than or equal to about 10, 9, 8, 7, 6, 5, 4, 3, 2, or less light sources. As an alternative to the light sources 428, a single light source may be used. The light projection device 426 directs a first light having a first wavelength through the print window 402 and into the film of the mixture 404 adjacent to the print window 402. The first wavelength emitted by the light projection device 426 is selected to produce photoinitiation and is used to create at least a portion of the 3D structure on the at least the portion of the 3D structure 408 that is adjacent to the build head 410 by curing the photoactive resin in the film of the mixture 404 within a photoinitiation layer 430. In some cases, the light projection device 426 is utilized in combination with one or more projection optics 432 (e.g. a projection lens for a digital light processing (DLP) device), such that the light output from the light projection device 426 passes through the one or more projection optics 432 prior to illuminating the film of the mixture 404 adjacent to the print window 402.

In some cases, the light projection device 426 is a DLP device including a digital micro-mirror device (DMD) for producing patterned light that can selectively illuminate and cure the photoactive resin in the photoinitiation layer 430. The light projection device 426, in communication with the one or more controllers, may receive instructions defining a pattern of illumination to be projected from the light projection device 426 into the photoinitiation layer 430 to cure a layer of the photoactive resin onto the at least the portion of the 3D structure 408.

The light sources 428 direct a second light having a second wavelength into the film of the mixture 404 adjacent to the open platform 401 comprising the print window 402. The second light may be provided as multiple beams from the light sources 428 through the print window 402 simultaneously. As an alternative, the second light may be generated from the light sources 428 and provided as a single beam through the print window 402. The second wavelength emitted by the light sources 428 is selected to produce photoinhibition in the photoactive resin in the film of the mixture 404 and is used to create a photoinhibition layer 434 within the film of the mixture 404 directly adjacent to the print window 402. The light sources 428 can produce a flood light to create the photoinhibition layer 434, the flood light being a non-patterned, high-intensity light. In some cases, the light sources 428 are light emitting diodes (LEDs) 436. The light sources 428 can be arranged on a light platform 438. The light platform 438 is mounted on adjustable axis rails 440. The adjustable axis rails 440 allow for movement of the light platform 438 along an axis towards or away from the print window 402. The light platform 438 and the one or more projection optics 432 may be moved independently. A relative position of the light platform comprising the light sources may be adjusted to project the second light into the photoinhibition layer 434 at the respective peak intensity and/or in a uniform projection manner. In some cases, the light platform 438 functions as a heat-sink for at least the light sources 428 arranged on the light platform 438.

The respective thicknesses of the photoinitiation layer 430 and the photoinhibition layer 434 may be adjusted by the one or more controllers. In some cases, this change in layer thickness(es) is performed for each new 3D printed layer, depending on the desired thickness of the 3D printed layer, and/or the type of mixture in the film of the mixture 404. The thickness(es) of the photoinitiation layer 430 and the photoinhibition layer 434 may be changed, for example, by changing the intensity of the respective light emitting devices (426 and/or 428), exposure times for the respective light emitting devices, or both. In some cases, by controlling relative rates of reactions between the photoactive species (e.g., at least one photoinitiator and at least one photoinhibitor), the overall rate of curing of the photoactive resin in the photoinitiation layer 430 and/or the photoinhibition layer 434 may be controlled. This process can thus be used to prevent curing from occurring at the film of the mixture-print window interface and control the rate at which curing of the photoactive resin takes place in the direction normal to the film of the photoactive resin-print window interface.

Other features of the printing system 400 of FIG. 4 may be as described in, for example, Patent Cooperation Treaty Patent Application No. PCT/US18/32837 ("VISCOUS FILM THREE-DIMENSIONAL PRINTING SYSTEMS AND METHODS"), which is entirely incorporated herein by reference.

Computer Systems

The present disclosure provides computer systems that are programmed to implement methods of the disclosure. Computer systems of the present disclosure may be used to regulate various operations of 3D printing, such as (i) providing a vat containing a mixture comprising a photoactive resin or a film of the mixture adjacent to an open platform and (ii) directing an optical source to provide light to the mixture to cure at least a portion of the mixture.

Figure 5:
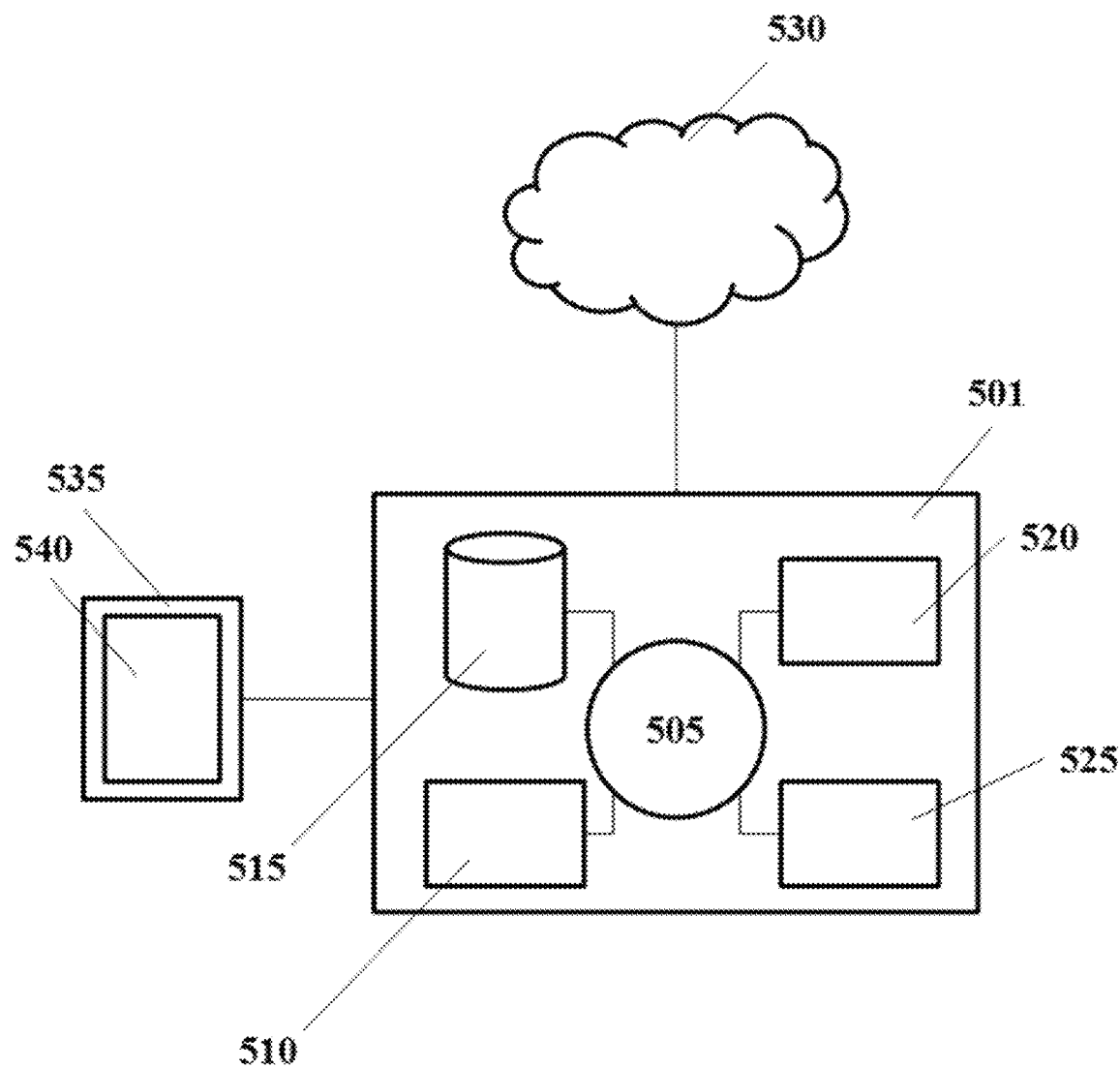
FIG. 5 shows a computer system that is programmed or otherwise configured to implement methods provided herein.

FIG. 5 shows a computer system 501 that is programmed or otherwise configured to communicate with and regulate various aspects of a 3D printer of the present disclosure. The computer system 501 can communicate with the light sources, build head, the inlet and/or outlet of a vat containing the mixture, and/or the open platform configured to hold a film of the mixture. The computer system 501 may also communicate with the 3D printing mechanisms or one or more controllers of the present disclosure. The computer system 501 can be an electronic device of a user or a computer system that is remotely located with respect to the electronic device. The electronic device can be a mobile electronic device.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, a window displaying a plurality of mixtures that the user can select to use for 3D printing. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505. The algorithm can, for example, determine appropriate intensity and exposure time of (i) the photoinitiation light and/or (ii) the photoinitiation light during the 3D printing.

EXAMPLES

The example below is illustrative and non-limiting.

Example 1

This example provides a working curve plot for a mixture. The mixture comprises the following components: monomers (between 1 wt. % to 80 wt. %); oligomers (between 1 wt. % to 30 wt. %), a photoinitiator (between 0.001 wt. % to 5 wt.) a co-initiator (between 0.01 wt. % to 3 wt. %), a photoinhibitor (between 0.001 wt. % to 5 wt.) a stabilizer (between 0.0001 wt. % to 0.5 wt. %), and a light absorber (between 0.001 wt. % to 5 wt. %). Different positions of a layer of the mixture are exposed to different doses of either the photoinitiation light or the photoinhibition light. The thickness of the newly formed polymeric material at each of the different positions are measured and plotted against their respective doses of light (FIG. 1, dotted plots). The dotted plots are fitted to the working curve equation (see Equation 2) to generate calculated working curves (FIG. 1, line plots). The x-intercept for the calculated working curve of the photoinitiation light is the critical energy of the photoinitiation light for the mixture. The x-intercept for the calculated working curve of the photoinhibition light is the critical energy of the photoinhibition light for the mixture.

Methods and systems of the present disclosure may be combined with or modified by other methods and systems, such as, for example, those described U.S. Patent Publication No. 2016/0067921 ("THREE DIMENSIONAL PRINTING ADHESION REDUCTION USING PHOTOINHIBITION"), U.S. patent application Ser. No. 15/919,124 ("MULTI WAVELENGTH STEREOLITHOGRAPHY HARDWARE CONFIGURATIONS"), and Patent Cooperation Treaty Patent Application No. PCT/US18/32837 ("VISCOUS FILM THREE-DIMENSIONAL PRINTING SYSTEMS AND METHODS"), each of which is entirely incorporated herein by reference.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for printing a three-dimensional (3D) object, comprising:
    (a) providing, adjacent to a build surface, a mixture comprising:
        (i) a polymeric precursor,
        (ii) a photoinitiator configured to initiate formation of a polymeric material from said polymeric precursor, and
        (iii) a photoinhibitor configured to inhibit formation of said polymeric material from said polymeric precursor; and
    (b) exposing said mixture to:
        (i) a first light having a first wavelength sufficient to cause said photoinitiator to initiate formation of said polymeric material from said polymeric precursor at a location disposed away from said build surface, and
        (ii) a second light having a second wavelength sufficient to cause said photoinhibitor to inhibit formation of said polymeric material from said polymeric precursor at a location adjacent to said build surface,
    wherein a ratio of (i) a rate of formation of said polymeric material upon exposure to said first light relative to (ii) a rate of formation of said polymeric material upon exposure to said second light is greater than 8.

2. The method of claim 1, wherein said ratio is greater than 10.

3. The method of claim 2, wherein said ratio is greater than 15.

4. The method of claim 1, wherein said mixture further comprises a stabilizer configured to inhibit formation of said polymeric material from at least a portion of said polymeric precursor.

5. The method of claim 4, wherein said stabilizer is a radical inhibitor.

6. The method of claim 1, wherein said mixture further comprises a co-initiator configured to initiate formation of said polymeric material from said polymeric precursor.

7. The method of claim 1, wherein said photoinhibitor comprises a hexaarylbiimidazole or a variant thereof.

8. The method of claim 7, wherein said hexaarylbiimidazole comprises a phenyl group, and wherein said phenyl group comprises a halogen or an alkoxy substitution.

9. The method of claim 1, wherein said polymeric precursor comprises one or more oligomers that cross-link to form said polymeric material.

10. The method of claim 1, wherein said polymeric precursor comprises monomers that polymerize to form said polymeric material.

11. The method of claim 1, wherein said mixture further comprises one or more particles.

12. The method of claim 11, wherein said one or more particles comprise at least one metal particle, at least one ceramic particle, or a combination thereof.

13. The method of claim 1, wherein said first wavelength and said second wavelength are different wavelengths.

14. The method of claim 1, further comprising, prior to (a), receiving or generating a computer model of said 3D object, wherein said at least said portion of said 3D object is in accordance to said computer model of said 3D object.

15. The method of claim 1, further comprising, prior to (a), selecting one or more components of said mixture such that said ratio is greater than 1.

16. The method of claim 1, wherein (a) further comprises providing a build head adjacent to said build surface, wherein said at least said portion of said 3D object is coupled to said build head upon formation, and wherein during formation of said at least said portion of said 3D object, said build head is moved along a direction away from said build surface.

17. The method of claim 1, wherein (a) comprises using a deposition head to provide said mixture adjacent to said build surface.

18. The method of claim 1, wherein said build surface is part of a vat configured to contain said mixture.

19. The method of claim 1, wherein said build surface is part of an open platform, and wherein (a) further comprises providing a film of said mixture adjacent to said open platform.

20. The method of claim 1, wherein said build surface comprises a window, and wherein (b) further comprises directing said first light and said second light through said window and into said mixture.

21. The method of claim 3, wherein said ratio is greater than 20.

22. The method of claim 3, wherein said ratio is greater than 30.

23. The method of claim 3, wherein said ratio is greater than 40.

24. The method of claim 3, wherein said ratio is greater than 50.

25. The method of claim 3, wherein said ratio is greater than 100.

* * * * *